US012563639B2

(12) United States Patent
Liu et al.

(10) Patent No.: US 12,563,639 B2
(45) Date of Patent: Feb. 24, 2026

(54) METHOD AND APPARATUS FOR PROCESSING SIDELINK PROCESS

(71) Applicant: HUAWEI TECHNOLOGIES CO., LTD., Shenzhen (CN)

(72) Inventors: Nannan Liu, Beijing (CN); Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 18/304,842

(22) Filed: Apr. 21, 2023

(65) Prior Publication Data

US 2023/0262838 A1     Aug. 17, 2023

Related U.S. Application Data

(63) Continuation of application No. PCT/CN2020/123450, filed on Oct. 23, 2020.

(51) Int. Cl.
H04W 76/30 (2018.01)
H04W 92/18 (2009.01)

(52) U.S. Cl.
CPC ............ H04W 76/30 (2018.02); H04W 92/18 (2013.01)

(58) Field of Classification Search
None
See application file for complete search history.

(56) References Cited

U.S. PATENT DOCUMENTS

| | | | |
|---|---|---|---|
| 10,652,919 B1 | 5/2020 | Li et al. | |
| 2019/0387570 A1 | 12/2019 | Byun et al. | |
| 2020/0337051 A1* | 10/2020 | Chang | H04W 72/0453 |
| 2022/0141887 A1* | 5/2022 | Ahn | H04L 5/0091 |
| | | | 370/329 |
| 2022/0201698 A1* | 6/2022 | Hahn | H04W 72/51 |
| 2022/0386403 A1* | 12/2022 | Park | H04W 76/14 |
| 2023/0300905 A1* | 9/2023 | Park | H04L 1/18 |
| | | | 370/329 |

FOREIGN PATENT DOCUMENTS

| | | |
|---|---|---|
| CN | 105589506 A | 5/2016 |
| CN | 110121192 A | 8/2019 |
| CN | 110662202 A | 1/2020 |
| CN | 110831192 A | 2/2020 |
| CN | 111436079 A | 7/2020 |

OTHER PUBLICATIONS

3GPP TS 38.306 V16.2.0, "3rd Generation Partnership Project; Technical Specification Group Radio Access Network; NR; User Equipment (UE) radio access capabilities (Release 16)," Sep. 2020, 126 pages.

(Continued)

*Primary Examiner* — Lonnie V Sweet
(74) *Attorney, Agent, or Firm* — Fish & Richardson P.C.

(57) ABSTRACT

This application relates to communications technology and provides methods and apparatuses for processing a sidelink process. In an implementation, a terminal device determines to perform media access control (MAC) reset on a radio resource control (RRC) connection of a sidelink and determines that a sidelink process associated with the RRC connection is unoccupied.

9 Claims, 10 Drawing Sheets

A terminal determines to perform MAC reset on an RRC connection of an SL    501

The terminal determines that a first SL process is unoccupied; and/or the terminal releases an association relationship associated with the first SL process    502

(56) References Cited

OTHER PUBLICATIONS

3GPP TS 38.321 V16.2.1, "3rd Generation Partnership Project; Technical Specification Group Radio Access Network; NR; Medium Access Control (MAC) protocol specification (Release 16)," Sep. 2020, 154 pages.

3GPP TS 38.331 V16.2.0, "3rd Generation Partnership Project; Technical Specification Group Radio Access Network; NR; Radio Resource Control (RRC) protocol specification (Release 16)," Sep. 2020, 926 pages.

International Search Report and Written Opinion in International Appln. No. PCT/CN2020/123450, mailed on Jul. 19, 2021, 21 pages (with English translation).

LG Electronics Inc., "Report of [Post109bis-e][957][V2X]: MAC issues (LG)," 3GPP TSG-RAN WG2 #110-e, R2-2005720, Online, Jun. 1-12, 2020, 97 pages.

ZTE Corporation et al., "CR on TS 38.321 for HARQ issues for NR V2X," 3GPP TSG-RAN WG2 Meeting #111 electronic, R2-2006819, Online, Aug. 17-28, 2020, 6 pages.

Extended European Search Report in European Appln No. 20958382. 2, dated Nov. 8, 2023, 17 pages.

LG Electronics Inc., "Corrections to 5G V2X with NR Sidelink," 3GPP TSG RAN WG2 #111-e, R2-2008330, Online, Aug. 17-28, 2020, 31 pages.

Office Action in Japanese Appln. No. 2023-524641, mailed on Jun. 25, 2024, 8 pages (with English translation).

* cited by examiner

Network device 1

Network device 2

Terminal 2

Terminal 1

Terminal 3

| Slot | 1 | | | | | | | | | | | | | | 2 | | | | | | | | | | | | | | 3 | | | | | | | | | | | | | | 4 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Symbol | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| Sidelink grant | | | | | ▨ | ▨ | ▨ | ▨ | ▨ | | | | | | | | | | ▨ | ▨ | ▨ | ▨ | ▨ | ▨ | | | | | | | | | ▨ | ▨ | ▨ | ▨ | ▨ | ▨ | | | | | | | | ▨ | ▨ | ▨ | ▨ | ▨ | ▨ | | | | | |
| Sidelink grant ID | | | | | | | 0 | | | | | | | | | | | | | | 1 | | | | | | | | | | | | | | 2 | | | | | | | | | | | | | 3 | | | | | | | | |

FIG. 2

A terminal determines to perform MAC reset on an RRC connection of an SL

501

The terminal determines that a first SL process is unoccupied; and/or the terminal releases an association relationship associated with the first SL process

502

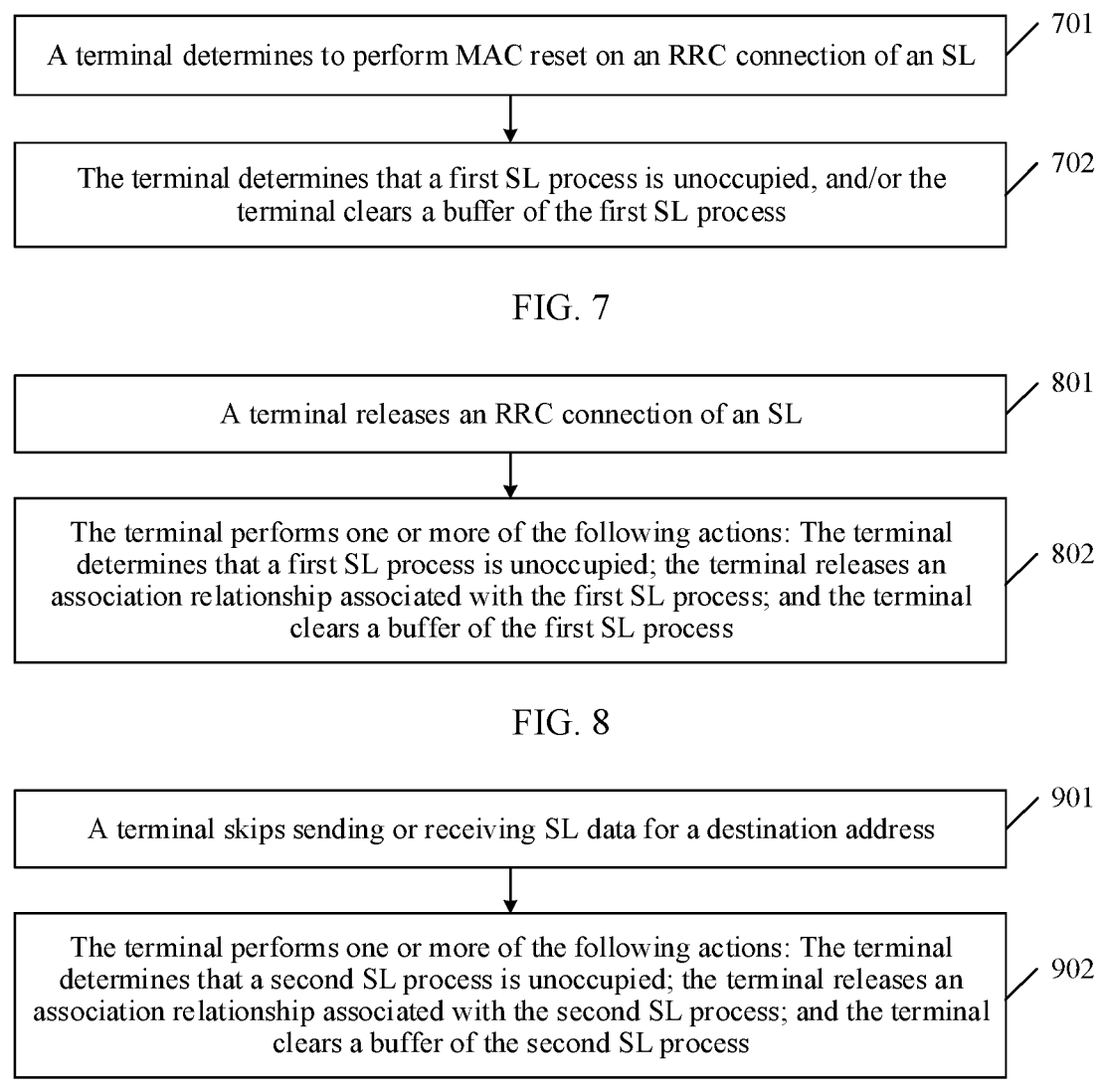

A terminal determines to perform MAC reset on an RRC connection of an SL — 701

The terminal determines that a first SL process is unoccupied, and/or the terminal clears a buffer of the first SL process — 702

FIG. 7

A terminal releases an RRC connection of an SL — 801

The terminal performs one or more of the following actions: The terminal determines that a first SL process is unoccupied; the terminal releases an association relationship associated with the first SL process; and the terminal clears a buffer of the first SL process — 802

FIG. 8

A terminal skips sending or receiving SL data for a destination address — 901

The terminal performs one or more of the following actions: The terminal determines that a second SL process is unoccupied; the terminal releases an association relationship associated with the second SL process; and the terminal clears a buffer of the second SL process — 902

FIG. 9

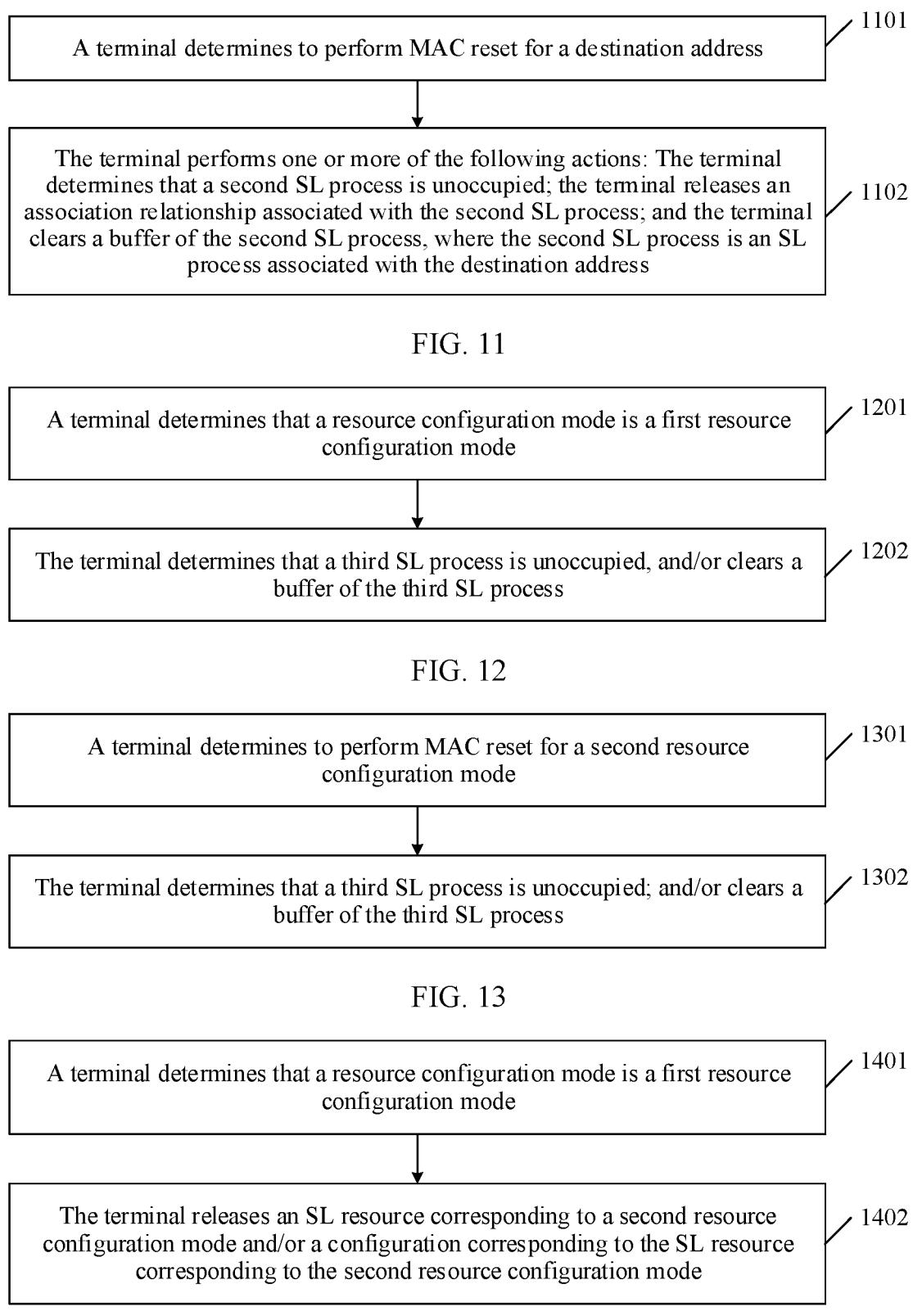

1101 A terminal determines to perform MAC reset for a destination address

1102 The terminal performs one or more of the following actions: The terminal determines that a second SL process is unoccupied; the terminal releases an association relationship associated with the second SL process; and the terminal clears a buffer of the second SL process, where the second SL process is an SL process associated with the destination address

FIG. 11

1201 A terminal determines that a resource configuration mode is a first resource configuration mode 1202 The terminal determines that a third SL process is unoccupied, and/or clears a buffer of the third SL process

FIG. 12

1301 A terminal determines to perform MAC reset for a second resource configuration mode 1302 The terminal determines that a third SL process is unoccupied; and/or clears a buffer of the third SL process

FIG. 13

1401 A terminal determines that a resource configuration mode is a first resource configuration mode 1402 The terminal releases an SL resource corresponding to a second resource configuration mode and/or a configuration corresponding to the SL resource corresponding to the second resource configuration mode

FIG. 14

METHOD AND APPARATUS FOR PROCESSING SIDELINK PROCESS

CROSS-REFERENCE TO RELATED APPLICATIONS

This application is a continuation of International Application No. PCT/CN2020/123450, filed on Oct. 23, 2020, the disclosure of which is hereby incorporated by reference in its entirety.

TECHNICAL FIELD

This application relates to the field of communication technologies, and in particular, to a method and an apparatus for processing a sidelink (sidelink, SL) process.

BACKGROUND

Vehicle to everything (vehicle to everything, V2X) is a key technology for an intelligent transportation system, and is considered to be one of fields with the biggest industrial potential and the clearest market requirements in an internet of things system. The vehicle to everything is usually a communication network that provides vehicle information by using sensors installed on vehicles, vehicle-mounted terminals, or the like, and implements vehicle to vehicle (vehicle to vehicle, V2V) communication, vehicle to infrastructure (vehicle to infrastructure, V2I) communication, vehicle to network (vehicle to network, V2N) communication, and vehicle to pedestrian (vehicle to pedestrian, V2P) communication.

The V2X features wide application space, great industry potential, and strong social benefits. The V2X is of great significance to promote innovation and development of the automobile and information communication industry, build new models and new forms of automobile and transportation services, promote innovation and application of technologies such as self driving, assisted driving, intelligent driving, connected driving, intelligent network driving, automated driving, and car sharing, and improve transportation efficiency and safety.

Generally, in a V2X scenario, a communication link for performing direct communication between a terminal and another terminal may be referred to as a sidelink (sidelink, SL) or a side link. A hybrid automatic repeat request (hybrid automatic repeat request, HARQ) process on the SL may be referred to as an SL process. Currently, there is no effective method for processing the SL process.

SUMMARY

Embodiments of this application provide a method and an apparatus for processing an SL process, to avoid a decrease in a quantity of available SL processes.

According to a first aspect, a method for processing a sidelink process is provided, including: A terminal determines to perform MAC reset on an RRC connection of a sidelink; the terminal determines that a first sidelink process is unoccupied; and/or the terminal releases an association relationship associated with the first sidelink process, where the first sidelink process is a sidelink process associated with the RRC connection. According to the method provided in the first aspect, when the terminal determines to perform MAC reset on the RRC connection of the SL or the terminal performs MAC reset on the RRC connection of the SL, the terminal determines that the first SL process is unoccupied, so that these SL processes may be used to receive other data. This avoids a decrease in a quantity of available SL processes, and improves a data receiving rate. The association relationship associated with the first SL process is released, to prevent the terminal from incorrectly clearing other data, or ensure receiving of data associated with the first SL process. This can improve data receiving reliability.

In a possible implementation, that a terminal determines to perform MAC reset on an RRC connection on a sidelink includes: An upper layer of a MAC layer of the terminal requests to perform MAC reset on the RRC connection; that the terminal determines that a first sidelink process is unoccupied includes: A MAC entity of the terminal determines that the first sidelink process is unoccupied; and that the terminal releases an association relationship associated with the first sidelink process includes: The MAC entity of the terminal releases the association relationship associated with the first sidelink process.

In a possible implementation, before the upper layer of the MAC layer of the terminal requests to perform MAC reset on the RRC connection, the method further includes: An upper layer of an RRC layer of the terminal requests to release the RRC connection.

In a possible implementation, the association relationship associated with the first sidelink process includes: an association relationship between the first sidelink process and SCI, and/or an association relationship between the first sidelink process and one or more of a first source identifier, a first destination identifier, a sidelink process identifier, and a communication type.

According to a second aspect, a method for processing a sidelink process is provided, including: A terminal determines to perform MAC reset on an RRC connection of a sidelink; the terminal determines that a first sidelink process is unoccupied; and/or the terminal clears a buffer of the first sidelink process, where the first sidelink process is a sidelink process associated with the RRC connection. According to the method provided in the second aspect, when the terminal determines to perform MAC reset on the RRC connection of the SL or the terminal performs MAC reset on the RRC connection of the SL, the terminal determines that the first SL process is unoccupied, so that these SL processes may be used to send other data. This avoids a decrease in a quantity of available SL processes, and improves a data receiving rate. The buffer of the first SL process is cleared, so that storage space may be released.

In a possible implementation, that a terminal determines to perform MAC reset on an RRC connection on a sidelink includes: An upper layer of a MAC layer of the terminal requests to perform MAC reset on the RRC connection; that the terminal determines that a first sidelink process is unoccupied includes: A MAC entity of the terminal determines that the first sidelink process is unoccupied; and that the terminal clears a buffer of the first sidelink process includes: The MAC entity of the terminal clears the buffer of the first sidelink process.

In a possible implementation, before the upper layer of the MAC layer of the terminal requests to perform MAC reset on the RRC connection, the method further includes: An upper layer of an RRC layer of the terminal requests to release the RRC connection.

In a possible implementation, before the terminal determines to perform MAC reset on the RRC connection of the sidelink, the method further includes: The terminal sends an SL RRC reconfiguration message; or the terminal sends an SL RRC reconfiguration message, and the terminal receives an SL RRC reconfiguration complete message, where the SL RRC reconfiguration message includes a full configuration indication.

According to a third aspect, a method for processing a sidelink process is provided, including: A terminal releases an RRC connection of a sidelink; and the terminal performs one or more of the following actions: The terminal determines that a first sidelink process is unoccupied, the terminal releases an association relationship associated with the first sidelink process, and the terminal clears a buffer of the first sidelink process, where the first sidelink process is a sidelink process associated with the RRC connection. According to the method provided in the third aspect, when the terminal releases the RRC connection of the SL, the terminal determines that the first SL process is unoccupied, so that these SL processes may be used to send other data. This avoids a decrease in a quantity of available SL processes, and improves a data receiving rate. The buffer of the first SL process is cleared, so that storage space may be released. The association relationship associated with the first SL process is released, to prevent the receive terminal from incorrectly clearing other data. This can improve data receiving reliability.

In a possible implementation, that a terminal releases an RRC connection of a sidelink includes: An RRC layer of the terminal releases the RRC connection, or an upper layer of the RRC layer of the terminal requests to release the RRC connection; that the terminal determines that a first sidelink process is unoccupied includes: A MAC entity of the terminal determines that the first sidelink process is unoccupied; and that the terminal releases an association relationship associated with the first sidelink process includes: The MAC entity of the terminal releases the association relationship associated with the first sidelink process; and that the terminal clears a buffer of the first sidelink process includes: The MAC entity of the terminal clears the buffer of the first sidelink process.

In a possible implementation, before the RRC layer of the terminal releases the RRC connection, the method further includes: The upper layer of the RRC layer of the terminal requests to release the RRC connection.

In a possible implementation, the association relationship associated with the first sidelink process includes: an association relationship between the first sidelink process and SCI, and/or an association relationship between the first sidelink process and one or more of a first source identifier, a first destination identifier, a sidelink process identifier, and a communication type.

According to a fourth aspect, a method for processing a sidelink process is provided, including: A terminal skips sending or receiving sidelink data for a destination address; and the terminal performs one or more of the following actions: The terminal determines that a second sidelink process is unoccupied, the terminal releases an association relationship associated with the second sidelink process, and the terminal clears a buffer of the second sidelink process, where the second sidelink process is a sidelink process associated with the destination address. According to the method provided in the fourth aspect, when the terminal skips sending or receiving the SL data for the destination address, the terminal determines that the second SL process is unoccupied, so that these SL processes may be used to send other data. This avoids a decrease in a quantity of available SL processes, and improves a data receiving rate. The buffer of the second SL process is cleared, so that storage space may be released. The association relationship associated with the second SL process is released, to prevent the terminal from incorrectly clearing other data.

In a possible implementation, that the terminal skips sending or receiving sidelink data includes: Transmission corresponding to the destination address is stopped, or the terminal does not need to send or receive sidelink data corresponding to the destination address.

In a possible implementation, the association relationship associated with the second sidelink process includes: an association relationship between the second sidelink process and SCI, and/or an association relationship between the second sidelink process and one or more of a first source identifier, a first destination identifier, a sidelink process identifier, and a communication type.

According to a fifth aspect, a method for processing a sidelink process is provided, including: A terminal determines to perform MAC reset for a destination address; and the terminal performs one or more of the following actions: The terminal determines that a second sidelink process is unoccupied, the terminal releases an association relationship associated with the second sidelink process, and the terminal clears a buffer of the second sidelink process, where the second sidelink process is a sidelink process associated with the destination address. According to the method provided in the fifth aspect, when the terminal performs MAC reset for the destination address, the terminal determines that the second SL process is unoccupied, so that these SL processes may be used to send other data. This avoids a decrease in a quantity of available SL processes, and improves a data receiving rate. The buffer of the second SL process is cleared, so that storage space may be released. The association relationship associated with the second SL process is released, to prevent the receive terminal from incorrectly clearing other data. This can improve data receiving reliability.

In a possible implementation, before the terminal determines to perform MAC reset, the method further includes: The terminal skips sending or receiving sidelink data for the destination address.

In a possible implementation, the association relationship associated with the second sidelink process includes: an association relationship between the second sidelink process and SCI, and/or an association relationship between the second sidelink process and one or more of a first source identifier, a first destination identifier, a sidelink process identifier, and a communication type.

According to a sixth aspect, a method for processing a sidelink process is provided, including: A terminal determines that a resource configuration mode is a first resource configuration mode; and the terminal determines that a third sidelink process is unoccupied, and/or clears a buffer of the third sidelink process, where the third sidelink process is a sidelink process associated with a second resource configuration mode. According to the method provided in the sixth aspect, if the terminal determines that the resource configuration mode is the first resource configuration mode, because the second resource configuration mode and the first resource configuration mode cannot coexist, the terminal does not use a resource in the second resource configuration mode. In this case, it is determined that the third SL process is unoccupied, so that these SL processes may be used to send other data. This avoids a quantity of available SL processes, and improves a data receiving rate. The buffer of the third SL process is cleared, so that storage space may be released.

In a possible implementation, a resource corresponding to the first resource configuration mode includes a configured sidelink grant resource and/or a dynamic sidelink grant resource, and when the terminal determines that the third sidelink process is unoccupied, and/or before the terminal clears the buffer of the third sidelink process, the method further includes: The terminal obtains the configured sidelink grant resource or the dynamic sidelink grant resource, and/or determines that a quantity of unoccupied sidelink processes is less than or equal to a first threshold.

In a possible implementation, a resource corresponding to the first resource configuration mode includes a selection sidelink resource, and before the terminal determines that the third sidelink process is unoccupied, and/or before the terminal clears the buffer of the third sidelink process, the method further includes: The terminal determines the selection sidelink resource, and/or determines that a quantity of unoccupied sidelink processes is less than or equal to a first threshold.

In a possible implementation, before the terminal determines that the third sidelink process is unoccupied, and/or clears the buffer of the third sidelink process, the method further includes: The terminal determines to perform MAC reset for the second resource configuration mode.

In a possible implementation, that the terminal determines that a third sidelink process is unoccupied, and/or clears a buffer of the third sidelink process includes: The terminal determines, based on one or more of a priority of data associated with the third sidelink process, a delay requirement of the data associated with the third sidelink process, and a reliability requirement of the data associated with the third sidelink process, that one or more of third sidelink processes are unoccupied, and/or clears one or more buffers of the third sidelink processes. Mode switching may occur frequently in the terminal. If a process is released immediately after mode switching, a severe packet loss may be caused, and a service with a high priority, a low latency requirement, and a high reliability requirement may not meet the requirement. In this possible implementation, this situation may be avoided.

In a possible implementation, the method further includes: The terminal releases a sidelink resource corresponding to the second resource configuration mode and/or a configuration corresponding to the sidelink resource corresponding to the second resource configuration mode, so that resources may be subsequently used by another terminal. Therefore, resource utilization is improved.

According to a seventh aspect, a method for processing a sidelink process is provided, including: A terminal determines to perform MAC reset for a second resource configuration mode; and the terminal determines that a third sidelink process is unoccupied, and/or clears a buffer of the third sidelink process, where the third sidelink process is a sidelink process associated with the second resource configuration mode. According to the method provided in the seventh aspect, if the terminal performs MAC reset for the second resource configuration mode, the terminal determines that the third SL process is unoccupied, so that these SL processes may be used to send other data. This avoids a decrease in a quantity of available SL processes, and improves a data receiving rate. The buffer of the third SL process is cleared, so that storage space may be released.

In a possible implementation, before the terminal determines to perform MAC reset for the second resource configuration mode, the method further includes: The terminal determines that a resource configuration mode is a first resource configuration mode.

In a possible implementation, that the terminal determines that a third sidelink process is unoccupied, and/or clears a buffer of the third sidelink process includes: The terminal determines, based on one or more of a priority of data associated with the third sidelink process, a delay requirement of the data associated with the third sidelink process, and a reliability requirement of the data associated with the third sidelink process, that one or more of third sidelink processes are unoccupied, and/or clears one or more buffers of the third sidelink processes.

In a possible implementation, the method further includes: The terminal releases a sidelink resource corresponding to the second resource configuration mode and/or a configuration corresponding to the sidelink resource corresponding to the second resource configuration mode.

According to an eighth aspect, a method for releasing a sidelink resource is provided, including: A terminal determines that a resource configuration mode is a first resource configuration mode; and the terminal releases a sidelink resource corresponding to a second resource configuration mode and/or a configuration corresponding to the sidelink resource corresponding to the second resource configuration mode. According to the eighth aspect, the SL resource associated with the second resource configuration mode and/or the configuration corresponding to the SL resource associated with the second resource configuration mode are/is released, so that these resources may be subsequently used by another terminal. Therefore, resource utilization is improved.

According to a ninth aspect, an apparatus for processing a sidelink process is provided, including a processing unit, configured to: determine to perform MAC reset on an RRC connection of a sidelink; determine that a first sidelink process is unoccupied; and/or release an association relationship associated with the first sidelink process, where the first sidelink process is a sidelink process associated with the RRC connection.

In a possible implementation, the processing unit is specifically configured to: request, at an upper layer of a MAC layer, to perform MAC reset on the RRC connection; determine, in a MAC entity, that the first sidelink process is unoccupied; and release, in the MAC entity, the association relationship associated with the first sidelink process.

In a possible implementation, the processing unit is further configured to request, at an upper layer of an RRC layer, to release the RRC connection.

In a possible implementation, the association relationship associated with the first sidelink process includes: an association relationship between the first sidelink process and SCI, and/or an association relationship between the first sidelink process and one or more of a first source identifier, a first destination identifier, a sidelink process identifier, and a communication type.

According to a tenth aspect, an apparatus for processing a sidelink process is provided, including a processing unit, configured to: determine to perform MAC reset on an RRC connection of a sidelink; determine that a first sidelink process is unoccupied; and/or clear a buffer of the first sidelink process, where the first sidelink process is a sidelink process associated with the RRC connection.

In a possible implementation, the processing unit is specifically configured to: request, at an upper layer of a MAC layer, to perform MAC reset on the RRC connection; determine, in a MAC entity, that the first sidelink process is unoccupied; and clear, in the MAC entity, the buffer of the first sidelink process.

In a possible implementation, the processing unit is further configured to request, at an upper layer of an RRC layer, to release the RRC connection.

In a possible implementation, the apparatus further includes a communication unit, where the communication unit is configured to send an SL RRC reconfiguration message; or the communication unit is configured to send an SL RRC reconfiguration message, and the apparatus receives an SL RRC reconfiguration complete message, where the SL RRC reconfiguration message includes a full configuration indication.

According to an eleventh aspect, am apparatus for processing a sidelink process is provided, including a processing unit, configured to: release an RRC connection of a sidelink; and perform one or more of the following actions: determining that a first sidelink process is unoccupied, releasing an association relationship associated with the first sidelink process, and clearing a buffer of the first sidelink process, where the first sidelink process is a sidelink process associated with the RRC connection.

In a possible implementation, the processing unit is specifically configured to: release the RRC connection at an RRC layer, or request to release the RRC connection at an upper layer of the RRC layer; determine, in a MAC entity, that the first sidelink process is unoccupied; release, in the MAC entity, an association relationship associated with the first sidelink process; and clear a buffer of the first sidelink process in the MAC entity.

In a possible implementation, the processing unit is further configured to request, at the upper layer of the RRC layer, to release the RRC connection.

In a possible implementation, the association relationship associated with the first sidelink process includes: an association relationship between the first sidelink process and SCI, and/or an association relationship between the first sidelink process and one or more of a first source identifier, a first destination identifier, a sidelink process identifier, and a communication type.

According to a twelfth aspect, an apparatus for processing a sidelink process is provided, including a processing unit, configured to: skip sending or receiving sidelink data for a destination address; and perform one or more of the following actions: determining that a second sidelink process is unoccupied, releasing an association relationship associated with the second sidelink process, and clearing a buffer of the second sidelink process, where the second sidelink process is a sidelink process associated with the destination address.

In a possible implementation, skipping sending or receiving the sidelink data includes: Transmission corresponding to the destination address is stopped, or the sidelink data corresponding to the destination address does not need to be sent or received.

In a possible implementation, the association relationship associated with the second sidelink process includes: an association relationship between the second sidelink process and SCI, and/or an association relationship between the second sidelink process and one or more of a first source identifier, a first destination identifier, a sidelink process identifier, and a communication type.

According to a thirteenth aspect, an apparatus for processing a sidelink process is provided, including a processing unit, configured to: determine, for a destination address, to perform MAC reset; and perform one or more of the following actions: determining that a second sidelink process is unoccupied, releasing an association relationship associated with the second sidelink process, and clearing a buffer of the second sidelink process, where the second sidelink process is a sidelink process associated with the destination address.

In a possible implementation, the processing unit is further configured to skip sending or receiving sidelink data for the destination address.

In a possible implementation, the association relationship associated with the second sidelink process includes: an association relationship between the second sidelink process and SCI, and/or an association relationship between the second sidelink process and one or more of a first source identifier, a first destination identifier, a sidelink process identifier, and a communication type.

According to a fourteenth aspect, an apparatus for processing a sidelink process is provided, including a processing unit, configured to: determine that a resource configuration mode is a first resource configuration mode; and determine that a third sidelink process is unoccupied, and/or clear a buffer of the third sidelink process, where the third sidelink process is a sidelink process associated with a second resource configuration mode.

In a possible implementation, a resource corresponding to the first resource configuration mode includes a configured sidelink grant resource and/or a dynamic sidelink grant resource, and the processing unit is further configured to: obtain the configured sidelink grant resource or the dynamic sidelink grant resource; and/or determine that a quantity of unoccupied sidelink processes is less than or equal to a first threshold.

In a possible implementation, a resource corresponding to the first resource configuration mode includes a selection sidelink resource, and the processing unit is further configured to: determine the selection sidelink resource, and/or determine that a quantity of unoccupied sidelink processes is less than or equal to a first threshold.

In a possible implementation, the processing unit is further configured to determine, for the second resource configuration mode, to perform MAC reset.

In a possible implementation, the processing unit is specifically configured to: determine, based on one or more of a priority of data associated with the third sidelink process, a latency requirement of the data associated with the third sidelink process, and a reliability requirement of the data associated with the third sidelink process, that one or more of third sidelink processes are unoccupied; and/or clear one or more buffers of the third sidelink processes.

In a possible implementation, the processing unit is further configured to release a sidelink resource corresponding to the second resource configuration mode and/or a configuration corresponding to the sidelink resource corresponding to the second resource configuration mode.

According to a fifteenth aspect, an apparatus for processing a sidelink process is provided, including a processing unit, configured to: determine, for a second resource configuration mode, to perform MAC reset; and determine that a third sidelink process is unoccupied, and/or clear a buffer of the third sidelink process, where the third sidelink process is a sidelink process associated with the second resource configuration mode.

In a possible implementation, the processing unit is further configured to determine that a resource configuration mode is a first resource configuration mode.

In a possible implementation, the processing unit is specifically configured to: determine, based on one or more of a priority of data associated with the third sidelink process, a latency requirement of the data associated with the third sidelink process, and a reliability requirement of the data associated with the third sidelink process, that one or more of third sidelink processes are unoccupied; and/or clear one or more buffers of the third sidelink processes.

In a possible implementation, the processing unit is further configured to release a sidelink resource corresponding to the second resource configuration mode and/or a configuration corresponding to the sidelink resource corresponding to the second resource configuration mode.

According to a sixteenth aspect, an apparatus for releasing a sidelink resource is provided, including a processing unit, configured to: determine that a resource configuration mode is a first resource configuration mode; and release a sidelink resource corresponding to a second resource configuration mode and/or a configuration corresponding to the sidelink resource corresponding to the second resource configuration mode.

According to a seventeenth aspect, an apparatus for processing a sidelink process is provided, including a processor. The processor is connected to a memory, the memory is configured to store computer-executable instructions, and the processor executes the computer-executable instructions stored in the memory, to implement any method provided in any one of the first aspect to the seventh aspect. For example, the memory and the processor may be integrated together, or may be independent components. If the memory and the processor are independent components, the memory may be located in the apparatus for processing the sidelink process, or may be located outside the apparatus for processing the sidelink process.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the apparatus for processing the sidelink process further includes a communication interface and a communication bus, and the processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the apparatus for processing the sidelink process exists in a product form of a chip.

According to an eighteenth aspect, an apparatus for releasing a sidelink resource is provided, including a processor. The processor is connected to a memory, the memory is configured to store computer-executable instructions, and the processor executes the computer-executable instructions stored in the memory, to implement the method provided in the eighth aspect. For example, the memory and the processor may be integrated together, or may be independent components. If the memory and the processor are independent components, the memory may be located in the apparatus for releasing the sidelink resource, or may be located outside the apparatus for releasing the sidelink resource.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the apparatus for releasing the sidelink resource further includes a communication interface and a communication bus, and the processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the apparatus for releasing the sidelink resource exists in a product form of a chip.

According to a nineteenth aspect, an apparatus for processing a sidelink process is provided, including a processor and an interface. The processor is coupled to a memory by using the interface, and when the processor executes a computer program or instructions in the memory, any method provided in any one of the first aspect to the seventh aspect is performed.

According to a twentieth aspect, an apparatus for releasing a sidelink resource is provided, including a processor and an interface. The processor is coupled to a memory by using the interface, and when the processor executes a computer program or instructions in the memory, the method provided in the eighth aspect is performed.

According to a twenty-first aspect, a computer-readable storage medium is provided, including computer-executable instructions. When the computer-executable instructions are run on a computer, the computer is enabled to perform any method provided in any one of the first aspect to the eighth aspect.

According to a twenty-second aspect, a computer program product is provided, including computer-executable instructions. When the computer-executable instructions are run on a computer, the computer is enabled to perform any method provided in any one of the first aspect to the eighth aspect.

For technical effects brought by any implementation of the ninth aspect to the twenty-second aspect, refer to technical effects brought by corresponding implementations of the first aspect to the eighth aspect. Details are not described herein again.

It should be noted that the solutions in the foregoing aspects may be combined on the premise that the solutions are not contradictory.

BRIEF DESCRIPTION OF DRAWINGS

FIG. 2 is a schematic diagram of a sidelink grant according to an embodiment of this application;

FIG. 7 is a schematic diagram of still another method for processing an SL process according to an embodiment of this application;

FIG. 8 is a schematic diagram of still another method for processing an SL process according to an embodiment of this application;

FIG. 9 is a schematic diagram of still another method for processing an SL process according to an embodiment of this application;

FIG. 11 is a schematic diagram of still another method for processing an SL process according to an embodiment of this application;

FIG. 12 is a schematic diagram of still another method for processing an SL process according to an embodiment of this application;

FIG. 13 is a schematic diagram of still another method for processing an SL process according to an embodiment of this application;

FIG. 14 is a schematic diagram of a method for releasing an SL resource according to an embodiment of this application;

DESCRIPTION OF EMBODIMENTS

In descriptions of this application, unless otherwise specified, "I" means "or". For example, AB may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design described as an "example" or "for example" in this application should not be explained as being more preferred or having more advantages than another embodiment or design. Exactly, use of the word such as "example" or "for example" is intended to present a relative concept in a specific manner.

The method provided in embodiments of this application is applicable to but is not limited to the following fields: device to device (device to device, D2D), V2X, self driving (unmanned driving), automated driving (automated driving, ADS), driver assistance (driver assistance, ADAS), intelligent driving (intelligent driving), connected driving (connected driving), intelligent network driving (intelligent network driving), car sharing (car sharing), and the like.

Figure 1:
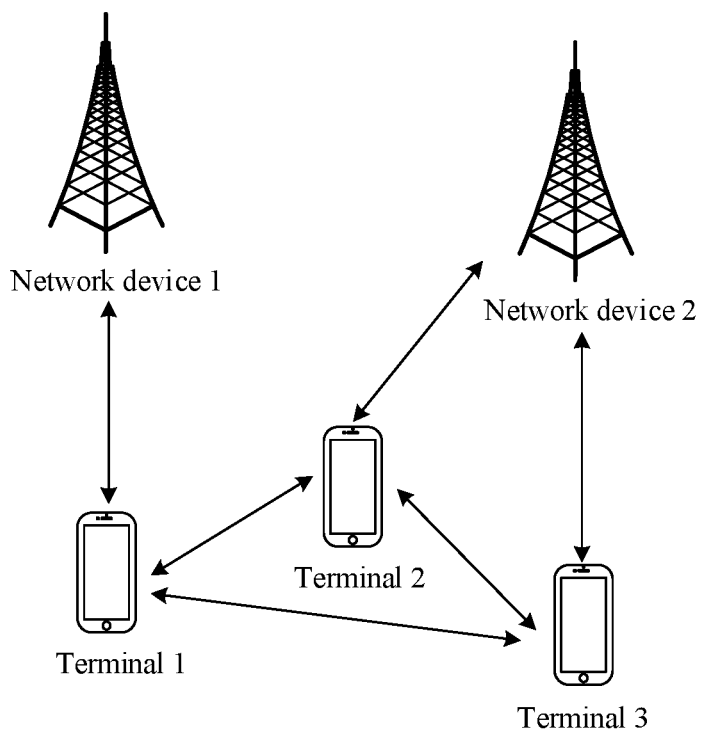
FIG. 1 is a schematic diagram of a communication scenario according to an embodiment of this application.

Network elements in this application include a network device and a terminal in a communication system. Refer to FIG. 1. A method provided in embodiments of this application mainly relates to communication between terminals.

The communication system in embodiments of this application includes but is not limited to a long term evolution (long term evolution, LTE) system, a 5th generation (5th-generation, 5G) system, a new radio (new radio, NR) system, a wireless local area network (wireless local area network, WLAN) system and a future evolved system, or a plurality of converged communication systems. The 5G system may be a non-standalone (non-standalone, NSA) 5G system or a standalone (standalone, SA) 5G system.

A network device in embodiments of this application is a network-side entity configured to: send a signal, receive a signal, or send a signal and receive a signal. The network device may be an apparatus that is deployed on a radio access network (radio access network, RAN) and that provides a wireless communication function for a terminal, for example, may be a transmission reception point (transmission reception point, TRP), a base station, or control nodes in various forms (for example, a network controller and a radio controller (for example, a radio controller in a cloud radio access network (cloud radio access network, CRAN) scenario)). Specifically, the network device may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminals within coverage of the plurality of base stations. In systems that use different radio access technologies, names of devices having functions of the base station may vary. For example, the device having a function of the base station may be referred to as an evolved NodeB (evolved NodeB, eNB or eNodeB) in the LTE system, or may be referred to as a next generation node base station (next generation node base station, gNB) in the 5G system or the NR system. A specific name of the base station is not limited in this application. The network device may alternatively be a network device in a future evolved public land mobile network (public land mobile network, PLMN) or the like.

The terminal in embodiments of this application is a user-side entity configured to receive a signal, send a signal, or receive a signal and send a signal. The terminal is configured to provide users with one or more of a voice service and a data connectivity service. The terminal may also be referred to as user equipment (user equipment, UE), a terminal device, an access terminal, a subscriber unit, a subscriber station, a mobile station, a remote station, a remote terminal, a mobile device, a user terminal, a wireless communication device, a user agent, or a user apparatus. The terminal may be a V2X device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or battery EV), a hybrid electric vehicle (hybrid electric vehicle, HEV), a range extended electric vehicle (range extended EV, REEV), a plug-in hybrid electric vehicle (plug-in HEV, PHEV), a new energy vehicle (new energy vehicle), or a road side unit (road site unit, RSU). Alternatively, the terminal may be a D2D device, for example, an electricity meter or a water meter. Alternatively, the terminal may be a mobile station (mobile station, MS), a subscriber unit (subscriber unit), an uncrewed aerial vehicle, an internet of things (internet of things, IoT) device, a station (station, ST) in a WLAN, a cellular phone (cellular phone), a smartphone (smartphone), a cordless telephone set, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

To make embodiments of this application clearer, the following briefly describes concepts and some content that are related to embodiments of this application.

1. Uplink (Uplink, UL), Downlink (Downlink, DL), and SL

A wireless communication link used by a terminal to send data (that is, uplink data) to a network device may be referred to as a UL. A wireless communication link used by a network device to send data (that is, downlink data) to a terminal may be referred to as a DL. A UL interface and a DL interface may be collectively referred to as a Uu interface. Therefore, the UL interface and the DL interface may be collectively referred to as a Uu interface link.

A communication link for direct communication between terminals may be referred to as an SL. The SL may also be referred to as a side link. Data transmitted between terminals may be referred to as SL data.

For example, data in embodiments of this application may be understood as a transport block (transport block, TB) or a medium access control (medium access control, MAC) protocol data unit (protocol data unit, PDU). The data may also be referred to as a data packet or a packet.

2. SL Resource Configuration Mode

SL transmission resource used by a transmit terminal in two terminals may be determined in any one of the following manner A and manner B.

Manner A: The SL transmission resource may be scheduled by a network device.

A mode in which the network device schedules the SL transmission resource may include a mode 1 (mode 1) resource configuration mode (a name in NR) or a mode 3 (mode 3) resource configuration mode (a name in LTE).

There are the following two types of SL transmission resources scheduled by the network device.

Type 1: SL Configured Granted (Configured Grant, CG) Resource

In this case, the network device does not need to separately allocate a resource to the transmit terminal during each data transmission. After the network device allocates the resource to the transmit terminal for one time, the transmit terminal may use the allocated resource in a future period of time. A feature of the foregoing allocation is that "a resource is allocated for one time, and can be used for a plurality of times". For example, the network device may configure, for the transmit terminal, a periodically occurring time domain resource. For example, refer to FIG. 2. A time domain resource that occurs for the first time in the periodically occurring time domain resource is a symbol 4 to a symbol 9 of a slot 1, and a period of the time domain resource is one slot. A time domain resource that appears each time is a grant of one SL (SL grant, referred to as a sidelink grant). FIG. 2 shows four sidelink grants, and one sidelink grant corresponds to one sidelink grant ID. Therefore, sidelink grant IDs corresponding to the four sidelink grants are sidelink grant 0, sidelink grant 1, sidelink grant 2, and sidelink grant 3.

The SL CG resource may include an SL type 1 (type 1) CG (SL configured grant type 1) resource and an SL type 2

(type 2) CG (SL configured grant type 2) resource. The SL type 1 CG resource may be an SL transmission resource directly configured by the network device for the transmit terminal by using radio resource control (radio resource control, RRC) signaling, and the transmit terminal may directly use the CG resource to transmit data without additional activating the resource. The SL type 1 CG resource may also be referred to as an SL grant free (SL grant free) resource. The SL type 2 CG resource may be a period in which the network device defines the SL transmission resource by using the RRC signaling, and then activates the SL transmission resource by using a physical downlink control channel (physical downlink control channel, PDCCH) or downlink control information (downlink control information, DCI), and the transmit terminal cannot directly use the SL transmission resource to transmit data, and can use the SL transmission resource only after the SL transmission resource is activated. The SL type 2 CG resource may also be referred to as an SL semi-persistent scheduling (SL Semi-Persistent Scheduling, SL SPS) resource.

For an SL, one carrier may support one or more CG resources. Optionally, different SL CG resources may correspond to different indexes. For example, CG resources whose indexes are 1, 2, and 3 may be respectively denoted as SL CG 1, SL CG 2, and SL CG 3.

Type 2: SL Dynamic Grant (Dynamic Grant, DG) Resource

For example, the SL transmission resource may be dynamically allocated by the network device to the transmit terminal by using DCI. The DCI may be carried on a PDCCH.

Manner B: The SL transmission resource may be autonomously determined by a transmit terminal.

For example, a mode in which the transmit terminal determines the SL transmission resource may include a mode 2 (mode 2) resource configuration mode (a name in NR) or a mode 4 (mode 4) resource configuration mode (a name in LTE).

In Manner B, when the transmit terminal is located within communication coverage of the network device, the network device may configure an SL resource pool for the transmit terminal by using a system broadcast message (system information block, SIB) or dedicated RRC signaling, and the transmit terminal may obtain the SL transmission resource from the SL resource pool, to send a control signal and/or a data signal to a receive terminal. When the transmit terminal is located outside the communication coverage of the network device, the transmit terminal may obtain the SL transmission resource from the SL resource pool preconfigured by the transmit terminal, to send the control signal and/or the data signal to the receive terminal.

When obtaining the SL transmission resource from the SL resource pool, the transmit terminal may sense or contend for the SL transmission resource. Specifically, the transmit terminal contends with another terminal for a proper SL transmission resource in the SL resource pool, to send the control signal and/or the data signal. For example, a higher priority of a to-be-transmitted V2X service or data of the transmit terminal indicates a higher possibility of obtaining the proper SL transmission resource in the SL resource pool through contention.

For ease of description, in this application, the mode 1 resource configuration mode, the mode 2 resource configuration mode, the mode 3 resource configuration mode, and the mode 4 resource configuration mode are respectively referred to as mode 1, mode 2, mode 3, and mode 4 for short. In a possible case, in LTE V2X, the mode 3 and the mode 4 cannot coexist. In a possible case, in NR V2X, the mode 1 and the mode 2 cannot coexist.

3. Sidelink Control Information (Sidelink Control Information, SCI)

Similar to DCI for scheduling Uu interface data, SCI is used to schedule SL data. For example, a first-level SCI may carry control information of the SL data. The SCI may be transmitted on a physical sidelink control channel (physical sidelink control channel, PSCCH).

4. HARQ

A HARQ is a technology that combines forward error correction (forward error correction, FEC) (or forward error correction code) with an automatic repeat request (automatic repeat request, ARQ) method.

FEC means that data sent by a transmit end includes forward error correction code or redundant information. After receiving the data, a receive end finds an error through a check (for example, a cyclic redundancy check (cyclic redundancy check, CRC)), and then can correct the error by using the forward error correction code or the redundant information. In this way, a quantity of retransmissions (namely, retransmitting the data) at the transmit end is reduced.

An ARQ means that the receive end determines correctness of received data through the check (for example, the CRC check). If the received data is correct, the receive end sends a positive acknowledgement (acknowledgement, ACK) to notify the transmit end that the received data is correct. If the received data is incorrect, the receive end sends a negative acknowledgement (negative acknowledgement, NACK) to notify the transmit end that the received data is incorrect. When receiving the NACK, the transmit end may retransmit the data to the receive end. The ACK and the NACK are HARQ feedback.

LTE V2X supports only a broadcast service. Therefore, SL HARQ feedback is not supported. NR V2X supports unicast, multicast, and broadcast services, and supports the SL HARQ feedback.

The following specifically describes HARQ-related content by using three parts: (a) to (c).

(a) HARQ Process

Figure 3:
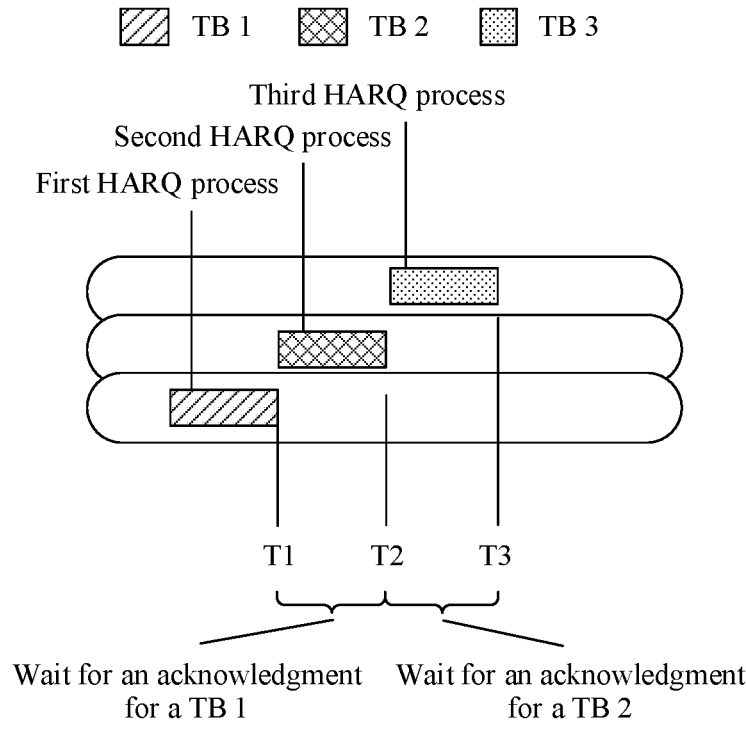
FIG. 3 is a schematic diagram of parallel HARQ processes according to an embodiment of this application.

A stop-and-wait protocol (stop-and-wait protocol) is used in a HARQ process to send data. In the stop-and-wait protocol, after sending a transport block (transport block, TB), the transmit end stops and waits for acknowledgment information. The receive end may feed back an ACK or a NACK of the TB. However, the transmit end stops and waits for the acknowledgement after each transmission. As a result, throughput is low. Therefore, the transmit end may use a plurality of parallel HARQ processes. When one HARQ process is waiting for the acknowledgment, the transmit end may use another HARQ process to continue sending data. For example, refer to FIG. 3. A terminal uses a first HARQ process to send a TB 1, finishes sending of the TB 1 at a moment T1, receives HARQ feedback of the TB 1 at a moment T2, and waits for an acknowledgment of the TB 1 in a time period from T1 to T2. During the time period of waiting for the acknowledgment of the TB 1, the terminal may use a second HARQ process to send a TB 2, finishes sending of the TB 2 at the moment T2, receives HARQ feedback of the TB 2 at a moment T3, and waits for an acknowledgment of the TB 2 within a time period from T2 to T3. During the period of waiting for the acknowledgment of the TB 2, the terminal may use a third HARQ process to send a TB 3

One HARQ process is identified by one HARQ process ID. A sidelink grant is associated with the HARQ process, and the terminal transmits HARQ data by using the process in the sidelink grant associated with the HARQ process.

(b) Processing Mechanisms of the Receive End for Newly Transmitted Data and Retransmitted Data Each HARQ process has a corresponding buffer (for example, a HARQ buffer or a soft buffer) at the receive end, to perform soft combination and decoding on received data.

After receiving newly transmitted data sent by the transmit end by using one HARQ process, the receive end may place the received newly transmitted data into a buffer corresponding to the HARQ process for decoding. If decoding fails, when receiving retransmitted data of the newly transmitted data again, the receive end may combine the received retransmitted data with the newly transmitted data previously stored in the buffer, place combined data into the buffer, and perform decoding again. The foregoing manner may be referred to as soft combination and decoding. Compared with separate decoding (that is, data during each transmission is separately decoded, and is not combined with previous data for decoding), a success rate of decoding is improved by using the soft combination and decoding manner. Similarly, if the decoding still fails, the foregoing procedure may be further repeated. Retransmitted data that is newly received is combined with data in the buffer, and decoding is performed again.

The retransmitted data and the newly transmitted data at the transmit end may be of a same redundancy version (redundancy version, RV) or different RVs of a same TB.

A HARQ process on a Uu interface is referred to as a HARQ process, and a HARQ process on an SL may be referred to as an SL process (SL process).

(c) SL Data Transmission that is Based on an SL Process

One transmit terminal may communicate with a plurality of receive terminals, that is, one transmit terminal may send SCI and SL data to the plurality of receive terminals. One receive terminal may also communicate with a plurality of transmit terminals, that is, one receive terminal may receive SCI and SL data from the plurality of transmit terminals. The SCI may include an SL process ID, a first destination ID (destination ID), a first source ID (source ID), and a communication type.

The SL process ID identifies an SL process, and is similar to the HARQ process ID of the Uu interface.

The first destination ID may identify a target (target) of SL data scheduled by the SCI. Optionally, the first destination ID may be used to perform data packet filtering at a PHY layer of the receive terminal. Optionally, the first destination ID may be some bits of a second destination ID. For example, the second destination ID is 24 bits (bit), and the first destination ID is lower-order 16 bits of the second destination ID.

The second destination ID identifies a target (for example, a target)/receive end/receive terminal of the data. For example, the second destination ID identifies a multicast service or a broadcast service. For example, the second destination ID may be an identifier of the target/receive end/receive terminal. For example, the second destination ID may be a destination layer 2 ID (Destination Layer-2 ID). Optionally, the second destination ID may be used to perform data packet filtering at a MAC layer of the receive terminal.

The first source ID identifies a source (source) of the SL data scheduled by the SCI. Optionally, the first source ID may be used to perform data packet filtering at the PHY layer of the receive terminal. Optionally, the first source ID may be some bits of a second source ID. For example, the second source ID is 24 bits, and the first source ID is lower-order eight bits of the second source ID.

The second source ID (source ID) identifies a source (for example, a sender)/transmit end/transmit terminal of the data. For example, the second source ID may be an identifier of the source/transmit end/transmit terminal. For example, the second source ID may be a source layer 2 ID (source Layer-2 ID). Optionally, the second source ID may be used to perform data packet filtering at the MAC layer of the receive terminal.

The communication type may include any one or more of unicast, multicast, and broadcast. The communication type in the SCI indicates whether current communication is unicast, multicast, or broadcast, or indicates whether the SL data scheduled by the SCI is unicast data, multicast data, or broadcast data.

For example, the receive terminal may detect surrounding SCI, and then determine, based on the first destination ID, the first source ID, and the communication type in the SCI, whether the receive terminal is interested in the SCI or the SL data scheduled by the SCI. If the receive terminal is interested in the SCI or the SL data, the receive terminal continues to receive the SL data scheduled by the SCI.

On a transmit side, an SL HARQ entity is included, and all SL processes (for example, 16 SL processes) maintained by the SL HARQ entity are shared by all connections/communication types (casttype). On a receive side, an SL HARQ entity is included, and all SL processes (for example, 64 SL processes) maintained by the SL HARQ entity are shared by all connections/communication types.

Different transmit terminals may use a same SL process ID to communicate with a same receive terminal. For the receive terminal, to distinguish data associated with the same SL process ID from different transmit terminals, the receive terminal receives one piece of SCI and/or data. After the receive terminal determines that the data is newly transmitted data, the receive terminal selects an unoccupied SL process (denoted as an SL process 1) for the data, and associates an "SL process ID+first destination ID+first source ID+communication type" in the SCI with the SL process 1. When the receive terminal receives retransmitted data corresponding to the same "SL process ID+first destination ID+first source ID+communication type" again, the receive terminal may place the retransmitted data into a buffer of the SL process 1, to perform soft combination and decoding on the received data. A "first destination ID+first source ID+communication type" may be referred to as SL identification information (sidelink identification information).

5. MAC Reset (MAC Reset)

On a Uu interface, a terminal determines to perform MAC reset (for example, an upper layer of a MAC layer of the terminal requests the MAC reset), and a MAC entity of the terminal performs any one or more of the following: stopping a running timer, canceling triggered beam failure recovery (beam failure recovery, BFR), canceling a triggered scheduling request (scheduling request, SR), resetting a MAC-related counter (for example, LBT COUNTER, BFI COUNTER, and the like), stopping an ongoing random access process, and the like. For specific content, refer to section 5.12 of TS 38.321. Details are not described herein again.

Currently, on an SL, a terminal determines to perform MAC reset (for example, an upper layer of a MAC layer of the terminal requests to perform MAC reset on an RRC connection of one SL), and a MAC entity of the terminal performs any one or more of the following: canceling a triggered SR that is associated only with the RRC connection of the SL, and canceling a triggered SL BSR that is associated only with the RRC connection of the SL, and clearing a soft buffer of an SL process associated with the RRC connection of the SL. For specific content, refer to section 5.12 of TS 38.321. Details are not described herein again.

Currently, for an RRC connection of an SL, an SL radio link failure (radio link failure, RLF) occurs, or a MAC layer of a receive terminal receives an SL RRC reconfiguration (RRCReconfigurationSidelink) message with a full configuration (fullconfig). In this case, the receive terminal performs MAC reset on the RRC connection of the SL.

The SL RRC reconfiguration message with the full configuration may be understood as: The SL RRC reconfiguration message includes a full configuration indication. The full configuration indication indicates that the SL RRC reconfiguration message should use the full configuration. For example, the full configuration indication is "sl-Reset-Config".

For example, the SL RRC reconfiguration message with the full configuration (fullconfig) indicates that, for an RRC connection of an SL, all reconfigurations are performed on the receive terminal. In other words, all configurations are updated for the RRC connection of the SL. For unicast transmission, a transmit terminal sends an SL configuration to the receive terminal by using the SL RRC reconfiguration message. If the SL RRC reconfiguration message includes an "sl-ResetConfig" parameter, it indicates that all SLs are configured.

The foregoing briefly describes concepts and some content related to embodiments of this application.

Currently, in one aspect, for an SL process, a receive terminal considers that the SL process is unoccupied in the following two cases:

(1) If the receive terminal successfully decodes received data, an SL process corresponding to the data is considered to be unoccupied.

(2) If the receive terminal again receives SCI for scheduling newly transmitted SL data or newly transmitted SL data corresponding to a same "SL process ID+first destination ID+first source ID+communication type", an SL process corresponding to the "SL process ID+first destination ID+first source ID+communication type" is considered to be unoccupied. Specifically, the receive terminal determines whether the "SL process ID+first destination ID+first source ID+communication type" in the SCI for scheduling the newly transmitted SL data is associated with an SL process (denoted as an SL process 2). If the "SL process ID+first destination ID+first source ID+communication type" in the SCI for scheduling the newly transmitted SL data is associated with the SL process 2, the SL process 2 is considered to be unoccupied, a buffer of the SL process 2 is cleared, and an unoccupied SL process (denoted as an SL process 3) is selected for the SCI for scheduling the newly transmitted SL data or the newly transmitted data. In addition, the SL process 3 is associated with the "SL process ID+first destination ID+first source ID+communication type" in the SCI.

In another aspect, for an RRC connection of an SL, the receive terminal performs SL MAC reset, and the receive terminal clears buffers of all SL processes associated with the RRC connection of the SL.

Currently, there are the following problems with processing of the SL process:

For a receive side, when an event 1 (the receive terminal determines to perform MAC reset on the RRC connection of the SL or the receive terminal performs MAC reset on the RRC connection of the SL), an event 2 (releasing an SL RRC connection), and an event 3 (the receive terminal skips receiving multicast and/or broadcast data) occur on the receive terminal, an association relationship between SCI (or an "SL process ID+first destination ID+first source ID+communication type") and an SL process is not released, and the SL process is not considered to be unoccupied. As a result, the following problems may occur.

On the one hand, SL processes are not considered to be unoccupied. Consequently, these SL processes cannot be used for receiving other data. This results in a decrease in a quantity of available SL processes.

Figure 4:
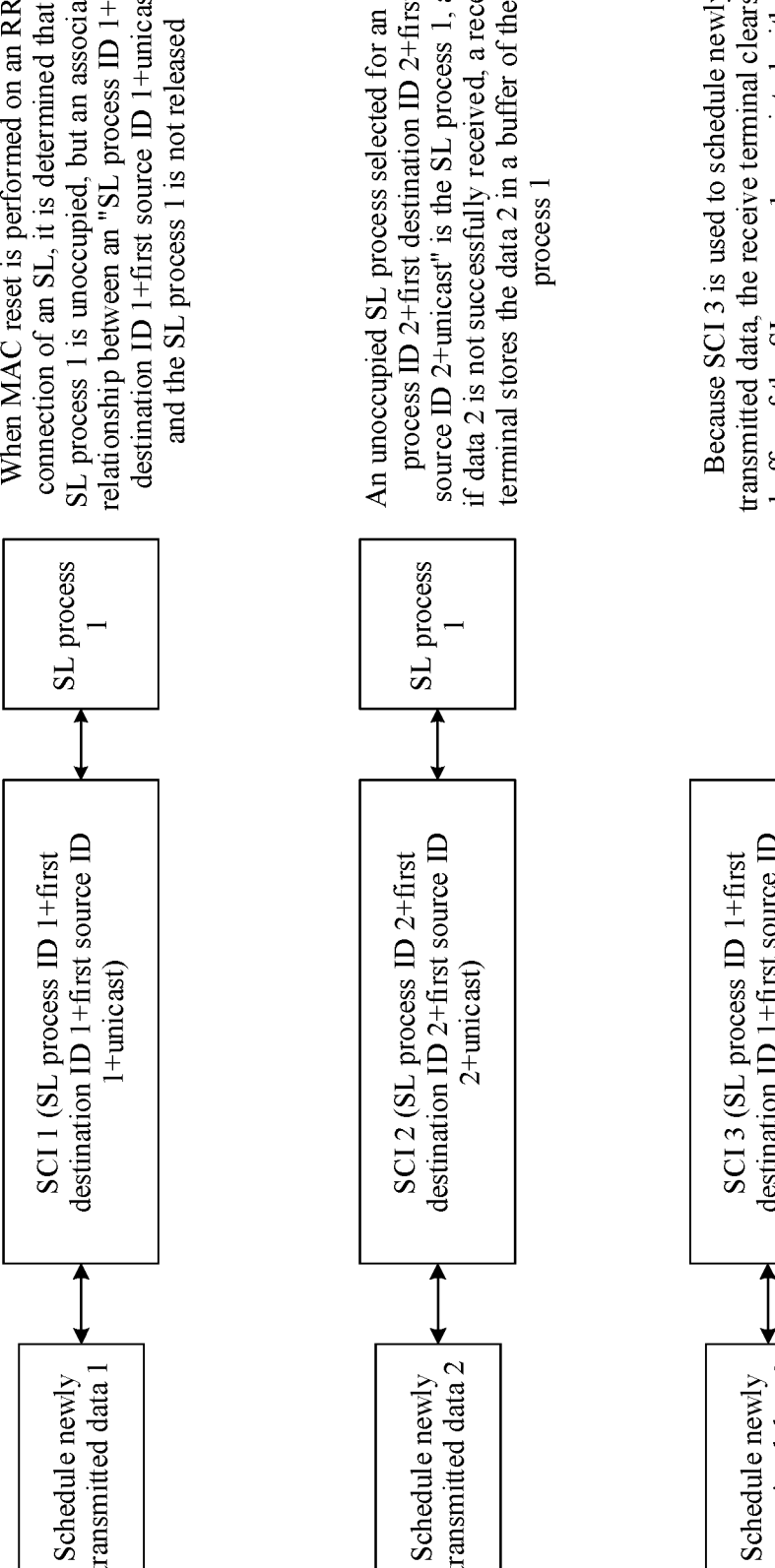
FIG. 4 is a schematic diagram of association between SCI and an SL process according to an embodiment of this application.

On the other hand, if only the SL process is considered to be unoccupied, and the association relationship between the SCI and the SL process is not released, the receive terminal receives the newly transmitted SL data scheduled by the SCI (SCI with the same "SL process ID+first destination ID+first source ID+communication type" as previous SCI) again, due to existence of the association relationship between the SCI and the SL process, the receive terminal may incorrectly clear other data in a buffer of the SL process. Refer to FIG. 4. For example, the receive terminal receives SCI 1 (including an "SL process ID 1+first destination ID 1+first source ID 1+unicast") that is used to schedule newly transmitted data 1. After the receive terminal receives the SCI 1, the receive terminal associates the "SL process ID 1+first destination ID 1+first source ID 1+unicast" with an SL process 1. In a subsequent procedure, when performing MAC reset on the RRC connection of the SL, the receive terminal determines that the SL process 1 associated with the RRC connection of the SL is unoccupied. However, the receive terminal does not release an association relationship between the "SL process ID 1+first destination ID 1+first source ID 1+unicast" and the SL process 1. If the receive terminal receives SCI 2 (including an "SL process ID 2+first destination ID 2+first source ID 2+unicast") that is used to schedule newly transmitted data 2, in this case, the receive terminal needs to select an unoccupied SL process for the "SL process ID 2+first destination ID 2+first source ID 2+unicast". If the selected unoccupied SL process is the SL process 1, and if the data 2 is not successfully received, a buffer of the SL process 1 includes the data 2. In this case, if the receive terminal receives SCI 3 (including the "SL process ID 1+first destination ID 1+first source ID 1+unicast") that is used to schedule newly transmitted data 3, that is, the receive terminal receives again the SCI for scheduling the newly transmitted SL data or the newly transmitted SL data corresponding to the "SL process ID 1+first destination ID 1+first source ID 1+unicast", because the association relationship between the "SL process ID 1+first destination ID 1+first source ID 1+unicast" and the SL process 1 still exists, the receive terminal clears the buffer of the SL process 1 associated with "SL process ID 1+first destination ID 1+first source ID 1+unicast", and considers the SL process 1 as unoccupied. In this case, there is still the data 2 to be processed in the buffer of the SL process 1. As a result, the terminal incorrectly clears the data 2, and affects receiving of the data 2. Alternatively, because the SL process 1 is incorrectly considered to be unoccupied, when transmission of the data 2 fails, the SL process 1 may be used for receiving other data. This affects receiving of the data 2.

When the foregoing event 1, the event 2, and the event 3 occur on a transmit terminal, the transmit terminal does not consider that the SL process is unoccupied, and does not clear a buffer of the SL process. In this case, the following problems may occur: If SL processes are not considered to be unoccupied, these SL processes cannot be used to send other data, and the quantity of available SL processes decreases; and if buffers of the SL processes are not cleared, these SL processes cannot be used to send other data, the quantity of available SL processes decreases, buffers are overloaded, or retransmission is incorrectly triggered.

To resolve these problems, this application provides a method for processing an SL process, including Embodiment 1 to Embodiment 5. The following separately describes Embodiment 1 to Embodiment 5.

Embodiment 1

Figure 5:
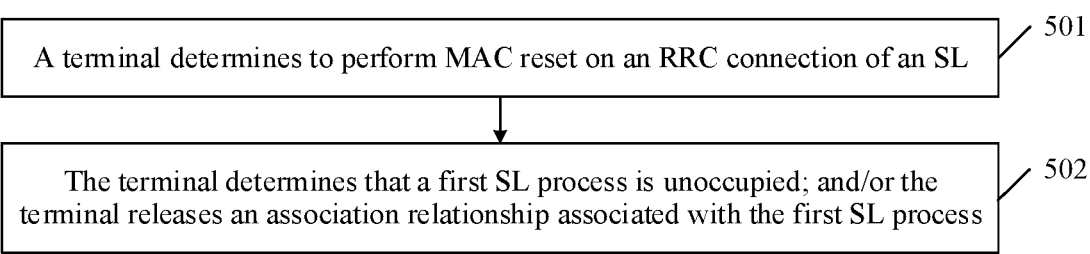
FIG. 5 is a schematic diagram of a method for processing an SL process according to an embodiment of this application.

Embodiment 1 may be used to resolve a problem caused by the following situations: When the event 1 occurs on the receive terminal, the association relationship between the SCI and the SL process is not released, and/or the SL process is not considered to be unoccupied. Refer to FIG. 5. The method includes the following steps.

501: A terminal determines to perform MAC reset on an RRC connection of an SL.

Step 501 may also be described as: The terminal performs MAC reset on the RRC connection of the SL. The terminal may be the receive terminal.

In embodiments of this application, for example, the RRC connection of the SL may be a logical connection between a second source ID and a second destination ID as a pair, or a logical connection between a second source ID and a second destination ID as a pair at an access stratum (access-stratum, AS) layer. The RRC connection of the SL may also be referred to as a PC5-RRC connection. In embodiments of this application, the RRC connection of the SL may include/be replaced with/correspond to any one or more of the following: a unicast, a unicast connection, a destination address, a second source ID-second destination ID pair (pair), and a second destination ID. In embodiments of this application, for example, the RRC connection of the SL may be understood as/replaced with the RRC connection of the SL, a unicast, a unicast connection, a destination address, a second source ID and a second destination ID as a pair, a second source ID-second destination ID pair, or a second destination ID. For example, an RRC connection of a first SL may be understood as/replaced as: a first unicast, a first unicast connection, a first destination address, a second source ID 1-second destination ID 1 pair, or a second destination ID 1.

In embodiments of this application, for example, the destination (destination) address is used to identify a unicast, a multicast, or a broadcast.

In embodiments of this application, for example, the second source ID-second destination ID pair is used to identify a unicast.

In embodiments of this application, performing MAC reset on the RRC connection of the SL may include/be replaced with/be understood as: performing SL-specific MAC reset (sidelink specific reset of the MAC entity) on the RRC connection of the SL.

In embodiments of this application, for example, any two or more of the RRC connection of the SL, the unicast connection, the destination address, the second source ID-second destination ID pair, the second destination ID, the second source ID, a first source ID corresponding to the second source ID and a first destination ID corresponding to the second destination ID as a pair, the first destination ID corresponding to the second destination ID, and the first source ID corresponding to the second source ID may be associated/corresponding to each other.

It should be noted that, step 501 does not limit whether the terminal has performed MAC reset on the RRC connection of the SL or not. For example, step 501 may be understood as: The terminal performs/prepares to perform MAC reset on the RRC connection of the SL.

502: The terminal determines that the first SL process is unoccupied, and/or the terminal releases an association relationship associated with the first SL process.

The first SL process is/includes an SL process associated with the RRC connection of the SL. For example, the first SL process may be/include one or more or all of SL processes associated with the RRC connection of the SL.

The SL process associated with the RRC connection of the SL may be understood as an SL process that is associated with the second source ID and the second destination ID and that corresponds to the RRC connection of the SL, or an SL process that is associated with the first source ID and the first destination ID and that corresponds to the RRC connection of the SL. For example, the second source ID and the second destination ID that correspond to the RRC connection of the SL are a second source ID 1 and a second destination ID 2, and an SL process associated with the RRC connection of the SL is an SL process associated with the second source ID 1 and the second destination ID 2. For example, the second source ID and the second destination ID that correspond to the RRC connection of the SL are a second source ID 1 and a second destination ID 2, the first source ID and the first destination ID that correspond to the second source ID 1 and the second destination ID 2 are a first source ID 1 and a first destination ID 2, and an SL process associated with the RRC connection of the SL is an SL process associated with the first source ID 1 and the first destination ID 2.

In embodiments of this application, the first SL process or the SL process associated with the RRC connection of the SL may include/be replaced with any one or more of the following: an SL process associated with the unicast connection, an SL process associated with the destination address, an SL process associated with the second destination ID, an SL process associated with the second source ID-second destination ID pair, an SL process associated with the first destination ID, and an SL process associated with a first source ID-first destination ID pair. For example, the association relationship associated with the first SL process includes: an association relationship between the first SL process and SCI, and/or an association relationship between the first SL process and one or more of an SL process ID, a first destination ID, a first source ID, and a communication type.

In embodiments of this application, determining an SL process to be unoccupied may include/be replaced with any one or more of the following: considering that the SL process is unoccupied, releasing the SL process, and deactivating the SL process. For example, determining the first SL process to be unoccupied may be understood as releasing the first SL process.

In embodiments of this application, releasing an association relationship associated with an SL process may include/be replaced with: deleting the association relationship associated with the SL process. For example, releasing the association relationship associated with the first SL process may include/be replaced with: deleting the association relationship associated with the first SL process.

Figure 6:
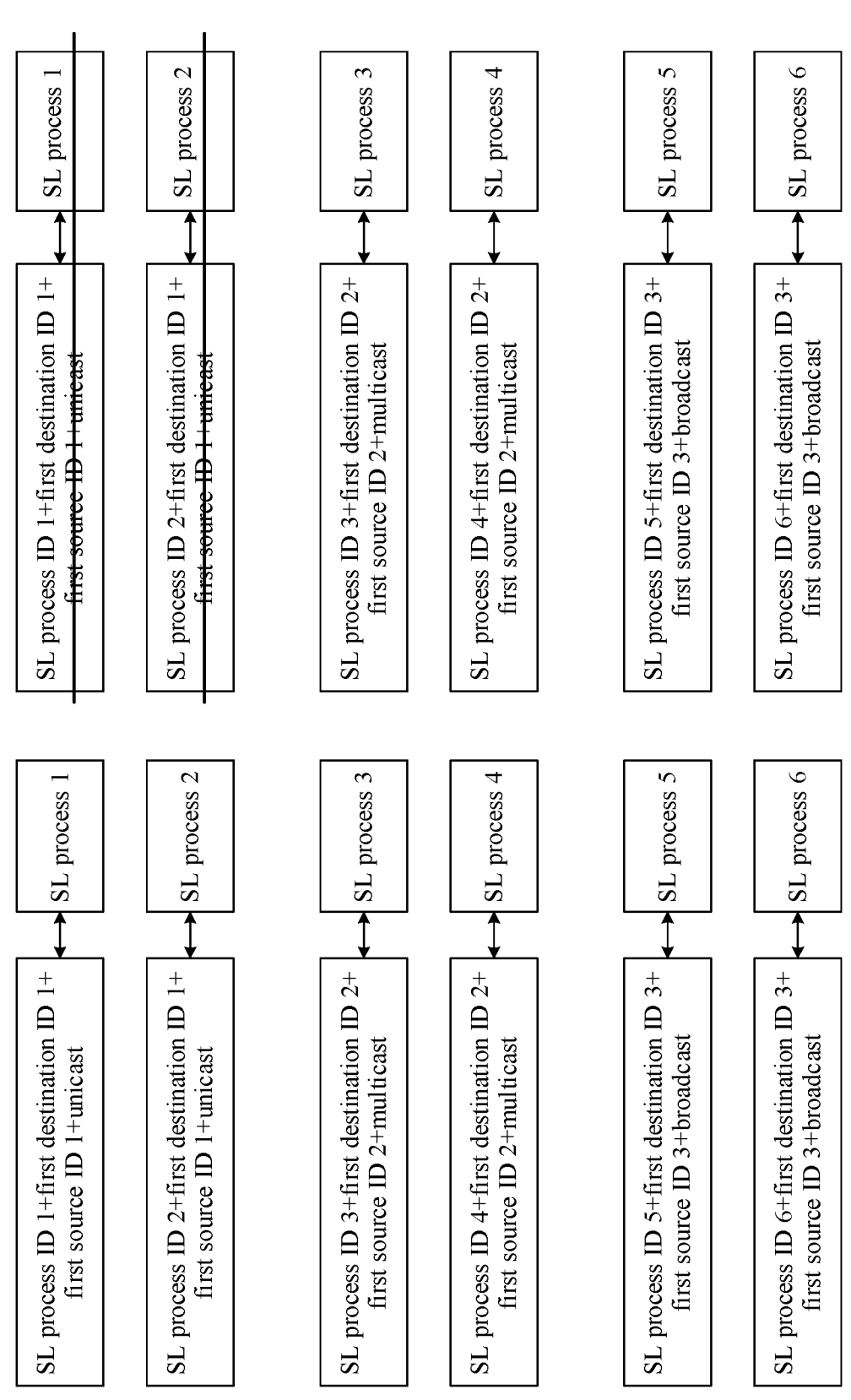
FIG. 6 is a schematic diagram of releasing an association relationship associated with an SL process according to an embodiment of this application.

For example, refer to FIG. 6. For an association relationship that exists in the terminal or previously exists in the terminal and that is associated with an SL process, refer to a left side in FIG. 6. If the terminal determines to perform MAC reset on the RRC connection of the SL, where the first source ID and the first destination ID that correspond to the RRC connection of the SL are respectively the first source ID 1 and the first destination ID 1, and the SL process associated with the RRC connection of the SL is an SL process 1 and an SL process 2, the terminal releases the SL process 1 and the SL process 2, and/or releases an association relationship associated with the SL process 1 and the SL process 2. In this case, for the association relationship that exists in the terminal and is associated with the SL process, refer to a right side in FIG. 6. It should be noted that the association relationship associated with the SL process shown in FIG. 6 is merely an example, and in actual implementation, the association relationship associated with the SL process may be another one. This is not limited in this application.

Optionally, step 501 includes one or more of the following actions: (1) An upper layer of a MAC layer of the terminal requests to perform MAC reset on the RRC connection of the SL; (2) the MAC layer of the terminal/the terminal is requested to perform MAC reset on the RRC connection of the SL; (3) the upper layer of the MAC layer of the terminal requests the MAC layer of the terminal to perform MAC reset on the RRC connection of the SL; (4) the MAC layer of the terminal determines to perform MAC reset on the RRC connection of the SL; and (5) the MAC layer of the terminal performs MAC reset on the RRC connection of the SL.

Optionally, that the terminal determines that the first SL process is unoccupied includes: The MAC layer of the terminal determines that the first SL process is unoccupied.

Optionally, that the terminal releases the association relationship associated with the first SL process includes: The MAC layer of the terminal releases the association relationship associated with the first SL process.

For example, the MAC layer of the terminal may be specifically a MAC entity of the terminal.

For example, the upper layer of the MAC layer may be an RRC layer, a radio link control (radio link control, RLC) layer, a packet data convergence protocol (packet data convergence protocol, PDCP) layer, or the like.

Optionally, when the following condition 3 is met, the terminal performs step 501 or any one or more actions in (1) to (5). The condition 3 includes any one or more of the following: An upper layer of an RRC layer of the terminal requests the RRC layer of the terminal to release the RRC connection of the SL; the upper layer of the RRC layer of the terminal requests to release the RRC connection of the SL; the upper layer of the RRC layer of the terminal indicates to release an SL unicast connection (PC5 unicast link) of the upper layer of the RRC layer of the terminal; the upper layer of the RRC layer of the terminal indicates the RRC layer of the terminal to release the SL unicast connection of the upper layer of the RRC layer of the terminal; the SL unicast connection of the upper layer of the RRC layer of the terminal is released; the RRC layer of the terminal/the terminal is requested to release the RRC connection of the SL; the RRC layer of the terminal/the terminal is indicated to release the SL unicast connection of the upper layer of the RRC layer of the terminal; and the RRC layer of the terminal/the terminal releases the RRC connection of the SL.

To be specific, a condition 1 (when an SL RLF occurs) and a condition 2 (the terminal receives an SL RRC reconfiguration message with a full configuration) may trigger the terminal to determine to perform MAC reset on the RRC connection of the SL or perform MAC reset on the RRC connection of the SL. In addition, the condition 3 may also trigger the terminal to perform the foregoing operations.

In embodiments of this application, for example, the upper layer of the RRC layer of the terminal may be a V2X layer, a non-access stratum (non-access stratum, NAS) layer, an application (application, APP) layer, or the like.

In embodiments of this application, a request may include/be replaced with/be understood as any one or more of the following: a configuration and an indication.

According to the method provided in Embodiment 1, when the terminal determines to perform MAC reset on the RRC connection of the SL or the terminal performs MAC reset on the RRC connection of the SL, the terminal determines that the first SL process is unoccupied, so that SL processes may be used to receive other data. This avoids a decrease in a quantity of available SL processes and improves a data receiving rate. According to the method provided in Embodiment 1, when the terminal determines to perform MAC reset on the RRC connection of the SL or the terminal performs MAC reset on the RRC connection of the SL, the terminal releases the association relationship associated with the first SL process, to prevent the terminal from incorrectly clearing other data, or ensure receiving of data associated with the first SL process. This can improve data receiving reliability.

Embodiment 2

Embodiment 2 may be used to resolve a problem caused by the following situations: When the event 1 occurs on the transmit terminal, the SL process is not considered to be unoccupied, and/or the buffer of the SL process is not cleared. Refer to FIG. 7. The method includes the following steps.

701: A terminal determines to perform MAC reset on an RRC connection of an SL.

Step 701 may also be described as: The terminal performs MAC reset on the RRC connection of the SL. The terminal may be a transmit terminal. For related descriptions of step 701, refer to step 501. Details are not described again.

702: The terminal determines that a first SL process is unoccupied, and/or the terminal clears a buffer of the first SL process.

For related descriptions of "the first SL process" in Embodiment 2, refer to Embodiment 1. Details are not described again.

For related description of "determining that an SL process is unoccupied" in Embodiment 2, refer to Embodiment 1. Details are not described again.

In embodiments of this application, clearing a buffer of an SL process may include/be replaced with: deleting the buffer of the SL process. For example, clearing the buffer of the first SL process may include/be replaced with: deleting the buffer of the first SL process. For example, if the terminal determines to perform MAC reset on the RRC connection of the SL, where a first source ID and a first destination ID that correspond to the RRC connection of the SL are respectively a first source ID 1 and a first destination ID 1, an SL process associated with the RRC connection of the SL is an SL process (for example, an SL process 1 and an SL process 2) associated with the first source ID 1 and the first destination ID 1, the terminal releases the SL process 1 and the SL process 2, and/or clears buffers of the SL process 1 and the SL process 2.

Optionally, step 701 includes one or more of the following actions: (1) An upper layer of a MAC layer of the terminal requests to perform MAC reset on the RRC connection of the SL; (2) the MAC layer of the terminal/the terminal is requested to perform MAC reset on the RRC connection of the SL; (3) the upper layer of the MAC layer of the terminal requests the MAC layer of the terminal to perform MAC reset on the RRC connection of the SL; (4) the MAC layer of the terminal determines to perform MAC reset on the RRC connection of the SL; and (5) the MAC layer of the terminal performs MAC reset on the RRC connection of the SL.

Optionally, that the terminal determines that a first SL process is unoccupied includes: The MAC layer of the terminal determines that the first SL process is unoccupied.

Optionally, that the terminal clears a buffer of the first SL process includes: The MAC layer of the terminal clears the buffer of the first SL process. For related descriptions of the optional method, refer to Embodiment 1. Details are not described again. For example, the MAC layer of the terminal may be specifically a MAC entity of the terminal.

Optionally, when the condition 3 is met, the terminal performs step 701 or any one or more actions in (1) to (5). For the description of the condition 3, refer to Embodiment 1. Details are not described again.

Optionally, when the following condition 4 is met, the terminal performs step 701 or any one or more actions in (1) to (5). The condition 4 may be: The terminal sends an SL RRC reconfiguration message, or the terminal sends an SL RRC reconfiguration message, and the terminal receives an SL RRC reconfiguration complete message. The SL RRC reconfiguration message includes a full configuration indication. The SL RRC reconfiguration message is associated with the RRC connection of the SL. The SL RRC reconfiguration complete message is associated with the RRC connection of the SL. The SL RRC reconfiguration complete message corresponds to the SL RRC reconfiguration message.

For example, if the terminal sends the SL RRC reconfiguration message for the RRC connection of the SL, or if the terminal sends the SL RRC reconfiguration message for the RRC connection of the SL and receives the SL RRC reconfiguration complete message, the SL RRC reconfiguration message includes the full configuration indication. The first source ID and the first destination ID that correspond to the RRC connection of the SL are respectively a first source ID 1 and a first destination ID 1, and an SL process associated with the RRC connection of the SL is an SL process associated with the first source ID 1 and the first destination ID 1 (for example, an SL process 1 and an SL process 2). The terminal determines that the SL process 1 and the SL process 2 are unoccupied, and/or clears buffers of the SL process 1 and the SL process 2.

Specifically, for a case in which the terminal sends the SL RRC reconfiguration message and the terminal determines to perform MAC reset on the RRC connection of the SL, the terminal may set the SL RRC reconfiguration message; or when/before/after the terminal sends the SL RRC reconfiguration message, the terminal determines to perform MAC reset on the RRC connection of the SL. This is not limited in this application. Setting the SL RRC reconfiguration message may be understood as generating or determining the SL RRC reconfiguration message.

Sending of the SL RRC reconfiguration message may be specifically performed by an RRC layer of the terminal.

To be specific, the condition 1 (when an SL RLF occurs) and the condition 2 (the terminal receives the SL RRC reconfiguration message with the full configuration) may trigger the terminal to determine to perform MAC reset on the RRC connection of the SL or perform MAC reset on the RRC connection of the SL. In addition, the condition 3 and/or the condition 4 may trigger the terminal to perform the foregoing operations.

It should be noted that, the terminal may also directly perform step 702 when the terminal sends the SL RRC reconfiguration message, or when the terminal sends the SL RRC reconfiguration message, and receives the SL RRC reconfiguration complete message.

According to the method provided in Embodiment 2, when the terminal determines to perform MAC reset on the RRC connection of the SL or the terminal performs MAC reset on the RRC connection of the SL, the terminal determines that the first SL process is unoccupied, so that these SL processes may be used to send other data. This avoids a decrease in a quantity of available SL processes and improves a data receiving rate. According to the method provided in Embodiment 2, when the terminal determines to perform MAC reset on the RRC connection of the SL or the terminal performs MAC reset on the RRC connection of the SL, the terminal clears the buffer of the first SL process, so that storage space may be released, or these SL processes may be used to send other data. This avoids the decrease in the quantity of available SL processes, and improves the data receiving rate.

Embodiment 3

Embodiment 3 may be used to resolve a problem caused by one or more of the following actions: When the event 2 occurs on the receive terminal, the association relationship between the SCI and the SL process is not released, the SL process is considered to be unoccupied, and the buffer of the SL process is cleared. Furthermore, Embodiment 3 may be used to resolve a problem caused by the following situations: When the event 2 occurs on the transmit terminal, the SL process is not considered to be unoccupied, and/or the buffer of the SL process is not cleared. Refer to FIG. 8. The method includes the following steps.

801: A terminal releases an RRC connection of an SL. In other words, the terminal skips receiving or sending unicast data.

The terminal may be the transmit terminal or the receive terminal. For related descriptions of the RRC connection of the SL, refer to Embodiment 1. Details are not described again.

802: The terminal performs one or more of the following actions: The terminal determines that a first SL process is unoccupied, the terminal releases an association relationship associated with the first SL process, and the terminal clears a buffer of the first SL process.

The first SL process is/includes an SL process associated with the RRC connection of the SL. For example, the first SL process may be/include one or more or all of SL processes associated with the RRC connection of the SL. For related descriptions of "the first SL process" or "an SL process associated with the RRC connection of the SL", refer to Embodiment 1. Details are not described again. Optionally, when the terminal is the receive terminal, the association relationship associated with the first SL process includes: an association relationship between the first SL process and SCI, and/or an association relationship between the first SL process and one or more of an SL process ID, a first destination ID, a first source ID, and a communication type.

In Embodiment 3, for related descriptions of "determining that an SL process is unoccupied" and "releasing an association relationship associated with the SL process", refer to Embodiment 1, and for related descriptions of "clearing a buffer of the SL process", refer to Embodiment 2. Details are not described again.

For example, if the terminal releases the RRC connection of the SL, where a first source ID and a first destination ID that correspond to the RRC connection of the SL are respectively a first source ID 1 and a first destination ID 1, an SL process associated with the RRC connection of the SL is an SL process (for example, an SL process 1 and an SL process 2) associated with the first source ID 1 and the first destination ID 1, the terminal performs one or more of the following actions: determining that the SL process 1 and the SL process 2 are unoccupied, clearing buffers of the SL process 1 and the SL process 2, and releasing association relationships associated with the SL process 1 and the SL process 2.

Optionally, that the terminal releases the RRC connection of the SL includes: An RRC layer of the terminal releases the RRC connection of the SL, or an upper layer of the RRC layer of the terminal requests to release the RRC connection.

Optionally, that the terminal determines that a first SL process is unoccupied includes: A MAC entity of the terminal determines that the first SL process is unoccupied.

Optionally, that the terminal releases an association relationship associated with the first SL process includes: The MAC entity of the terminal releases the association relationship associated with the first SL process.

Optionally, that the terminal clears a buffer of the first SL process includes: The MAC entity of the terminal clears the buffer of the first SL process.

Optionally, when the condition 3 is met, the RRC layer of the terminal releases the RRC connection of the SL.

According to the method provided in Embodiment 3, when the terminal releases the RRC connection of the SL, the terminal determines that the first SL process is unoccupied, so that these SL processes may be used to send or receive other data. This avoids a decrease in a quantity of available SL processes, and improves a data sending/receiving rate. According to the method provided in Embodiment 3, when the terminal releases the RRC connection of the SL, the buffer of the first SL process may be cleared, so that storage space may be released, or these SL processes may be used to send or receive other data. This avoids the decrease in the quantity of available SL processes, and improves the data sending/receiving rate. According to the method provided in Embodiment 3, when the terminal releases the RRC connection of the SL, the association relationship associated with the first SL process may be released. Therefore, this prevents the receive terminal from incorrectly clearing other data, to improve data receiving reliability. Alternatively, this ensures receiving of data associated with the first SL process, to improve data receiving reliability.

Embodiment 4

Embodiment 4 may be used to resolve a problem caused by one or more of the following actions: When the event 3 occurs on the receive terminal, the association relationship between the SCI and the SL process is not released, the SL process is considered to be unoccupied, and the buffer of the SL process is cleared. Furthermore, Embodiment 4 may be used to resolve a problem caused by the following situations: When the event 3 occurs on the transmit terminal, the SL process is not considered to be unoccupied, and/or the buffer of the SL process is not cleared. Refer to FIG. 9. The method includes the following steps.

901: A terminal skips sending or receiving SL data for a destination address.

The destination (destination) address is used to identify a multicast, a broadcast, or a unicast.

In embodiments of this application, the destination address may include/be replaced with/correspond to any one or more of the following: a multicast, a multicast service, a broadcast, a broadcast service, a unicast, a unicast connection, an RRC connection of an SL, a second source ID-second destination ID pair (pair), a second destination ID, a first source ID-first destination ID pair (pair), and a first destination ID.

In embodiments of this application, the destination address may alternatively include/be replaced with/correspond to any one or more of the following: a destination address, a multicast, a multicast service, a broadcast service, an RRC connection of an SL, a unicast, a unicast connection, a destination address, a second source ID and a second destination ID as a pair, a second source ID-second destination ID pair, a second destination ID, a first source ID and a first destination ID as a pair, a first source ID-first destination ID pair, or a first destination ID. For example, a first destination address may be understood as/replaced as: a first multicast, a first multicast service, a first broadcast, a first broadcast service, an RRC connection of the first SL, a first unicast, a first unicast connection, a first destination address, a second source ID 1-second destination ID 1 pair, a second destination ID 1, a first source ID 1-first destination ID 1 pair, or a first destination ID 1.

It should be noted that skipping sending or receiving may be understood as: sending or receiving has been performed before, and no (re)sending or receiving is performed at present. This is not limited to not sending or receiving in the future. 902: The terminal performs one or more of the following actions: The terminal determines that a second SL process is unoccupied, the terminal releases an association relationship associated with the second SL process, and the terminal clears a buffer of the second SL process. For example, the action in step 902 may be performed by a MAC layer of the terminal.

The second SL process is/includes an SL process associated with the destination address. For example, the second SL process may be/include one or more or all of SL processes associated with the destination address.

The SL process associated with the destination address may be understood as an SL process associated with a second destination ID corresponding to the destination address, or an SL process associated with a first destination ID corresponding to the destination address. For example, the second destination ID corresponding to the destination address is a second destination ID 2, and an SL process associated with the destination address is an SL process associated with the second destination ID 2. For example, the second destination ID corresponding to the destination address is a second destination ID 2, the first destination ID corresponding to the second destination ID 2 is a first destination ID 2, and an SL process associated with the destination address is an SL process associated with the first destination ID 2. In embodiments of this application, the first SL process or the SL process associated with the destination address may include/be replaced with any one or more of the following: an SL process associated with the multicast/multicast service, an SL process associated with the broadcast/broadcast service, an SL process associated with the second destination ID, and an SL process associated with the first destination ID.

For example, when the terminal is the receive terminal, the association relationship associated with the second SL process includes: an association relationship between the second SL process and SCI, and/or an association relationship between the second SL process and one or more of an SL process ID, a first destination ID, a first source ID, and a communication type.

In Embodiment 4, for related descriptions of "determining that an SL process is unoccupied" and "releasing an association relationship associated with the SL process", refer to Embodiment 1, and for related descriptions of "clearing a buffer of the SL process", refer to Embodiment 2. Details are not described again.

Figure 10:
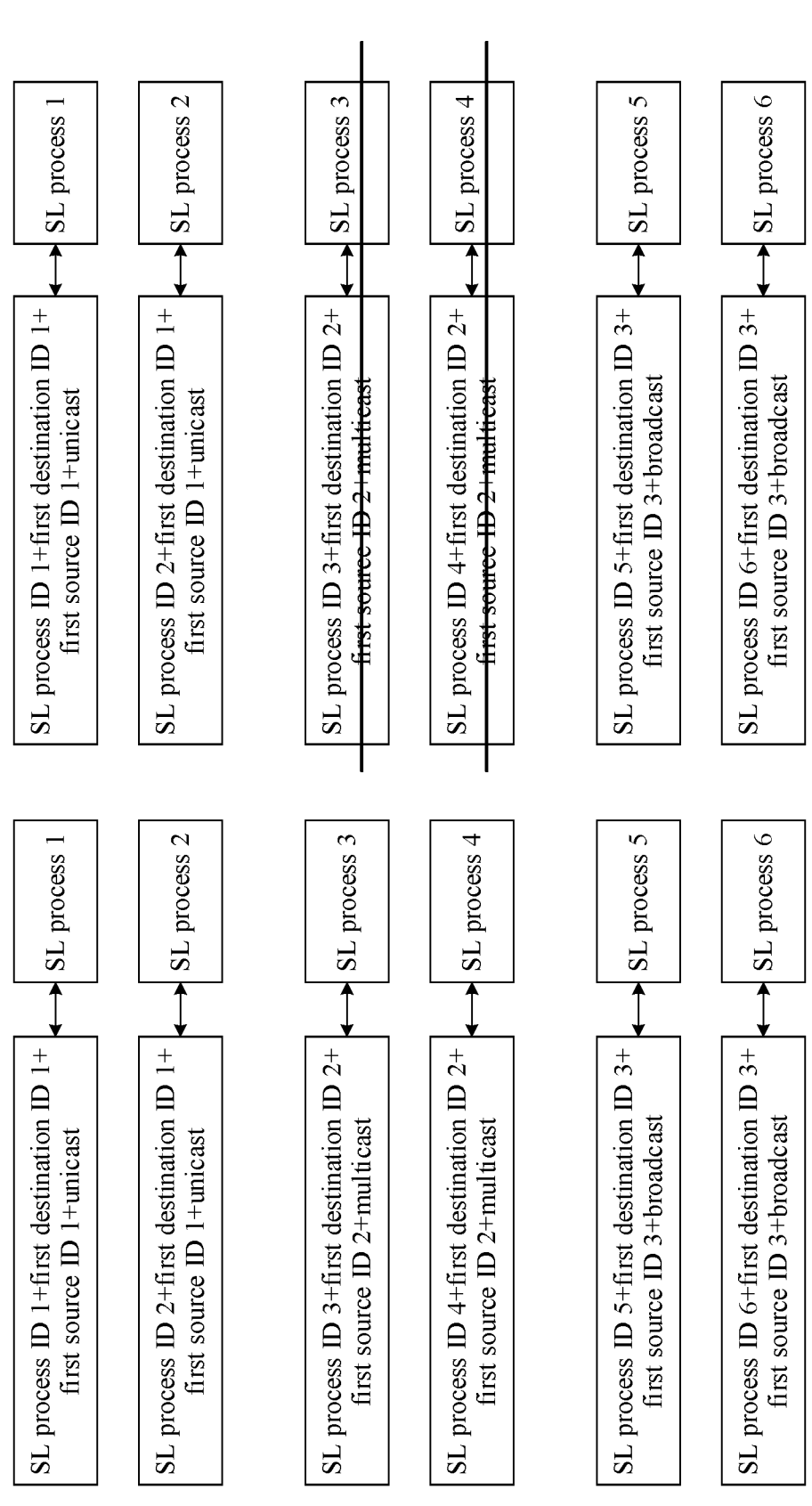
FIG. 10 is still another schematic diagram of releasing an association relationship associated with an SL process according to an embodiment of this application.

For example, refer to FIG. 10. A multicast is used as an example. For an association relationship that exists in the terminal or previously exists in the terminal and that is associated with an SL process, refer to a left side in FIG. 10. If the terminal skips receiving SL data for the destination address, where the first source ID and the first destination ID corresponding to the destination address are respectively a first source ID 2 and a first destination ID 2, SL processes associated with the destination address are an SL process 3 and an SL process 4, the terminal releases the SL process 3 and the SL process 4, and/or releases association relationships with the SL process 3 and the SL process 4. In this case, for the association relationship that exists in the terminal and is associated with the SL process, refer to a right side in FIG. 10. It should be noted that the association relationship associated with the SL process shown in FIG. 10 is merely an example, and in actual implementation, the association relationship associated with the SL process may be another one. This is not limited in this application.

Optionally, that the terminal skips sending or receiving SL data includes: Transmission corresponding to the destination address is stopped, or the terminal does not need to send or receive SL data corresponding to the destination address (in other words, the terminal is no longer interested in the transmission corresponding to the destination address).

The transmission corresponding to the destination address may include multicast transmission or broadcast transmission corresponding to the destination address.

That the transmission corresponding to the destination address is stopped may be understood as stopping of the multicast transmission or the broadcast transmission corresponding to the destination address. In other words, a multicast or broadcast for the destination address is stopped or no longer sent.

That the terminal does not need to send or receive SL data corresponding to the destination address may include: The terminal determines that the SL data corresponding to the destination address does not need to be sent or received, and the terminal is no longer interested in the transmission corresponding to the destination address.

It should be noted that, that the terminal is no longer interested in the transmission means that the terminal was interested before and is not interested at present. This is not limited to whether the terminal is interested in the transmission in the future.

Specifically, an upper layer of an RRC layer of the terminal may request (in other words, indicate or configure) not to be interested in the transmission corresponding to the destination address. The upper layer of the RRC layer of the terminal may request (or indicate or configure) to terminate the transmission for the destination address.

According to the method provided in Embodiment 4, when the terminal skips sending or receiving the SL data for the destination address, the terminal determines that the second SL process is unoccupied, so that these SL processes may be used to send or receive other data. This avoids a decrease in a quantity of available SL processes, and improves a data sending/receiving rate. According to the method provided in Embodiment 4, when the terminal skips sending or receiving the SL data for the destination address, the buffer of the second SL process may be cleared, so that storage space may be released, or SL processes may be used to send or receive other data. This avoids the decrease in the quantity of available SL processes, and improves the data sending/receiving rate. According to the method provided in Embodiment 4, when the terminal skips sending or receiving the SL data for the destination address, the association relationship associated with the second SL process may be released, to prevent the receive terminal from incorrectly clearing other data, or ensure receiving of data associated with the first SL process. This can improve data receiving reliability.

Embodiment 5

Embodiment 5 may be used to resolve a problem caused by one or more of the following actions: When the event 3 occurs on the receive terminal, the association relationship between the SCI and the SL process is not released, the SL process is considered to be unoccupied, and the buffer of the SL process is cleared. Furthermore, Embodiment 5 may be used to resolve a problem caused by the following situations: When the event 3 occurs on the transmit terminal, the SL process is not considered to be unoccupied, and/or the buffer of the SL process is not cleared. Refer to FIG. 11. The method includes the following steps.

1101: A terminal determines to perform MAC reset for a destination address.

In embodiments of this application, performing MAC reset for the destination address may include/be replaced/be understood as: performing SL-specific MAC reset (sidelink specific reset of the MAC entity) for the destination address. For related description of the destination address, refer to Embodiment 4. Details are not described again.

Step 1101 may also be described as: For the destination address, the terminal performs MAC reset.

The destination (destination) address is used to identify a multicast or a broadcast.

Optionally, before step 1101, the method further includes: The terminal skips sending or receiving SL data for the destination address. For a related description of the following action: "the terminal skips sending or receiving SL data for the destination address", refer to Embodiment 4. Details are not described again.

1102: The terminal performs one or more of the following actions: The terminal determines that a second SL process is unoccupied; the terminal releases an association relationship associated with the second SL process; and the terminal clears a buffer of the second SL process, where the second SL process is an SL process associated with the destination address.

Optionally, the association relationship associated with the second SL process includes: an association relationship between the second SL process and SCI, and/or an association relationship between the second SL process and one or more of an SL process ID, a first destination ID, a first source ID, and a communication type.

For related descriptions of step 1102, refer to the foregoing step 902. Details are not described again.

According to the method provided in Embodiment 5, when the terminal performs MAC reset for the destination address, the terminal determines that the second SL process is unoccupied, so that these SL processes may be used to send or receive other data. This avoids a decrease in a quantity of available SL processes, and improves a data sending/receiving rate. According to the method provided in Embodiment 5, when the terminal performs MAC reset for the destination address, the buffer of the second SL process may be cleared, so that storage space may be released, or SL processes may be used to send or receive other data. This avoids the decrease in the quantity of available SL processes, and improves the data sending/receiving rate. According to the method provided in Embodiment 5, when the terminal performs MAC reset for the destination address, the association relationship associated with the second SL process may be released. Therefore, this prevents the receive terminal from incorrectly clearing other data, to improve data receiving reliability. Alternatively, this ensures receiving of data associated with the first SL process, to improve data receiving reliability.

In addition, in addition to the foregoing Embodiment 1 to Embodiment 5, the following Solution 1 and Solution 2 may further be available.

Solution 1: PC5-S transmission for a destination address is stopped at an upper layer of an RRC layer; or an upper layer of an RRC layer requests (or indicates or configures) to terminate the PC5-S transmission for the destination address, and the terminal performs one or more of the following actions: The terminal determines that a fourth SL process is unoccupied, the terminal releases an association relationship associated with the fourth SL process, and the terminal clears a buffer of the fourth SL process. The fourth SL process refers to an SL process associated with the PC5-S of the destination address or the destination address.

Solution 2: PC5-S transmission for a destination address is stopped at an upper layer of an RRC layer; or an upper layer of an RRC layer requests (or indicates or configures) to terminate the PC5-S transmission for the destination address, the terminal performs MAC reset for the PC5-S of the destination address or the destination address, and the terminal performs one or more of the following actions: The terminal determines that a fourth SL process is unoccupied, the terminal releases an association relationship associated with the fourth SL process, and the terminal clears a buffer of the fourth SL process. Currently, in an existing NR V2X protocol, a mode 1 and a mode 2 cannot coexist, and retransmission cannot be performed between different resource configuration modes. To be specific, data newly transmitted by using a resource of the mode 1 cannot be retransmitted by using a resource of the mode 2, and data newly transmitted by using the resource of the mode 2 cannot be retransmitted by using resource of the mode 1. When a resource configuration mode is switched/changed (mode switching for short), an SL process processing mechanism is not specified on a transmit terminal side. After the mode switching, if an occupied process in an original resource configuration mode is still occupied, a quantity of processes available to the transmit terminal may decrease. To resolve this problem, this application further provides methods for processing an SL process shown in Embodiment 6 and Embodiment 7. The following separately describes the methods. A terminal in Embodiment 6 and Embodiment 7 may be a transmit terminal.

Embodiment 6

Refer to FIG. 12. A method for processing an SL process according to Embodiment 6 includes the following steps.

1201: A terminal determines that a resource configuration mode is a first resource configuration mode.

Step 1201 may also be described as: The terminal determines that the resource configuration mode is switched from a second resource configuration mode to the first resource configuration mode (that is, the resource configuration mode of the terminal before mode switching is the second resource configuration mode), or the terminal determines that the resource configuration mode is switched from the first resource configuration mode and the second resource configuration mode to the first resource configuration mode (that is, before mode switching, the resource configuration mode of the terminal is the first resource configuration mode and the second resource configuration mode).

In this application, switching may be replaced with changing.

The first resource configuration mode may be the mode 1, or may be the mode 2. That a terminal determines that a resource configuration mode is a first resource configuration mode may include any one or more of the following: A MAC layer of the terminal determines that the resource configuration mode is the first resource configuration mode, the MAC layer of the terminal/the terminal is configured with the first resource configuration mode as the resource configuration mode, an RRC layer of the terminal configures the first resource configuration mode as the resource configuration mode, and the RRC layer of the terminal configures the resource configuration mode to the MAC layer of the terminal as the first resource configuration mode. For example, specifically, when a MAC entity of the terminal configures that the SL resource is associated with the mode 1, the terminal determines that the resource configuration mode is the mode 1. When the RRC layer of the terminal configures that the SL resource is associated with the mode 2, the terminal determines that the resource configuration mode is the mode 2.

1202: The terminal determines that a third SL process is unoccupied, and/or clears a buffer of the third SL process.

The third SL process is an SL process associated with the second resource configuration mode, that is, the third SL process or the SL process associated with the second resource configuration mode may be understood as an SL process that sends data by using a resource corresponding to the second resource configuration mode, and/or an SL process associated with the resource corresponding to the second resource configuration mode.

If the first resource configuration mode is the mode 1, the second resource configuration mode is the mode 2. If the first resource configuration mode is the mode 2, the second resource configuration mode is the mode 1.

According to the method provided in Embodiment 6, if the terminal determines that the resource configuration mode is the first resource configuration mode, the terminal determines that the third SL process is unoccupied, so that these SL processes may be used to send other data. This avoids a decrease in a quantity of available SL processes, and improves a data receiving rate. The buffer of the third SL process is cleared, so that storage space can be released, and SL processes may also be used to send other data. This avoids the decrease in the quantity of available SL processes, and improves the data sending/receiving rate.

Optionally, a resource corresponding to the first resource configuration mode includes a configured SL grant resource (that is, an SL CG resource) or a dynamic SL grant resource (that is, an SL DG resource) (that is, the first resource configuration mode is the mode 1). Before step 1202, the method further includes: The terminal (for example, may be a HARQ entity of the terminal) obtains the configured SL grant resource or the dynamic SL grant resource (that is, a resource of the mode 1 is obtained, and the resource may optionally be a newly transmitted resource), and/or the terminal determines that a quantity of unoccupied SL processes is less than or equal to a first threshold.

Optionally, that the terminal obtains the configured SL grant resource or the dynamic SL grant resource may include: The terminal obtains the configured SL grant resource or the dynamic SL grant resource, and obtains data transmitted on the configured SL grant resource or the dynamic SL grant resource.

The first threshold may be configured/indicated/sent by a network device to a terminal, may be preconfigured, may be specified in a protocol, may be stored in a terminal by a device manufacturer before the terminal is delivered from a factory, or may be preconfigured in a terminal by a network device/another device when the terminal connects to a network. For example, the first threshold may be 0, 2, 3, or the like.

For example, that a quantity of unoccupied SL processes is less than or equal to a first threshold may be understood as that all SL processes are occupied, or the quantity of unoccupied SL processes is less than or equal to a quantity of SL processes required by the terminal.

After step 1201, the terminal may directly perform step 1202, or may perform step 1202 when the configuration SL grant resource or the dynamic SL grant resource is obtained, and/or the quantity of unoccupied SL processes is less than or equal to the first threshold.

It should be noted that, when the first resource configuration mode is the mode 1, an SL resource of the terminal is scheduled by a network device, and the terminal selects the SL process only after obtaining the configured SL grant resource or the dynamic SL grant resource. Therefore, the terminal may perform step 1202 when/after obtaining the configuration SL grant resource or the dynamic SL grant resource.

Optionally, a resource corresponding to the first resource configuration mode includes a selection SL resource (selection sidelink resource) (that is, the first resource configuration mode is the mode 2). Before step 1202, the method further includes: The terminal determines the selection SL resource. (that is, the terminal needs to perform resource selection or determine a resource), and/or a quantity of unoccupied SL processes is less than or equal to a first threshold.

After step 1201, the terminal may directly perform step 1202, or may perform step 1202 when the selection SL resource is determined, and/or the quantity of unoccupied SL processes is less than or equal to the first threshold.

It should be noted that, when the first resource configuration mode is the mode 2, an SL resource of the terminal is selected by the terminal, and the terminal determines the SL process to perform resource selection. Therefore, the terminal may perform step 1202 when/after determining to perform resource selection.

Optionally, before step 1202, the method further includes: The terminal determines to perform MAC reset for the second resource configuration mode. To be specific, mode switching triggers MAC reset for the second resource configuration mode, and the MAC reset triggers execution of step 1202.

In embodiments of this application, performing MAC reset for the second resource configuration mode may include/be replaced with/be understood as: performing SL-specific MAC reset (sidelink specific reset of the MAC entity) for the second resource configuration mode.

Optionally, during specific implementation of step 1202, it may be determined that one or more third SL processes are unoccupied, and/or one or more buffers of the third SL processes are cleared based on one or more pieces of the following information.

Information 1: A priority of data associated with the third SL process

Information 2: A latency requirement of data associated with the third SL process Information 3: A reliability requirement of data associated with the third SL process For example, for the information 1, the terminal may determine that one or more SL processes associated with data with a lowest priority or a priority lower than a priority threshold are unoccupied, and/or the terminal may clear buffers corresponding to the one or more SL processes.

For example, for the information 2, the terminal may determine that one or more SL processes associated with data with a highest latency requirement or a latency requirement lower than a latency threshold are unoccupied, and/or the terminal may clear buffers corresponding to the one or more SL processes.

For example, for the information 3, the terminal may determine that one or more SL processes associated with data with a lowest reliability requirement or a reliability requirement lower than a reliability threshold are unoccupied, and/or the terminal may clear buffers corresponding to the one or more SL processes.

In the terminal, mode switching may occur frequently. If a process is released immediately after mode switching, a severe packet loss may be caused. A service with a high priority, a low latency requirement, and a high reliability requirement may not meet a requirement, and this optional method may be used to avoid this situation. In addition, the terminal may alternatively determine, after a time period after mode switching, that one or more SL processes associated with data are unoccupied, and/or the terminal may clear buffers corresponding to the one or more SL processes.

In Embodiment 6, the terminal may process SL processes one by one. For example, one SL process is used to process one SL process, a plurality of SL processes may be used to process a plurality of SL processes, or all the SL processes may be processed at a time. This is not limited in this application. The "processing" herein includes: determining that an SL process is unoccupied, and/or clearing a buffer corresponding to the SL process.

Optionally, the method further includes: The terminal releases an SL resource corresponding to the second resource configuration mode and/or a configuration corresponding to the SL resource corresponding to the second resource configuration mode, so that resources may be subsequently used by another terminal. Therefore, resource utilization is improved.

Embodiment 7

Refer to FIG. 13. A method for processing an SL process according to Embodiment 7 includes the following steps.

1301: A terminal determines to perform MAC reset for a second resource configuration mode.

During specific implementation of step 1301, the terminal may perform step 1301 when the second resource configuration mode is switched to another resource configuration mode. For example, the terminal may perform step 1301 when a resource configuration mode is switched from the second resource configuration mode to a first resource configuration mode. Alternatively, the terminal may perform step 1301 when the resource configuration mode is switched from the first resource configuration mode and the second resource configuration mode to the first resource configuration mode. Alternatively, the terminal may perform step 1301 when triggered by another trigger condition.

The second resource configuration mode may be a mode 1, or may be a mode 2.

Optionally, before step 1301, the method further includes: The terminal determines that the resource configuration mode is the first resource configuration mode. For related descriptions of this step, refer to the foregoing step 1201. Details are not described again.

1302: The terminal determines that a third SL process is unoccupied, and/or clears a buffer of the third SL process.

Optionally, during specific implementation of step 1302, it may be determined that one or more third SL processes are unoccupied, and/or one or more buffers of third SL processes are cleared based on one or more pieces of the following information.

Information 1: A priority of data associated with the third SL process

Information 2: A latency requirement of data associated with the third SL process Information 3: A reliability requirement of data associated with the third SL process For related descriptions of the optional method, refer to the foregoing Embodiment 6. Details are not described again.

Optionally, the method further includes: The terminal releases an SL resource corresponding to the second resource configuration mode and/or a configuration corresponding to the SL resource corresponding to the second resource configuration mode, so that resources may be subsequently used by another terminal. Therefore, resource utilization is improved.

According to the method provided in Embodiment 7, if the terminal determines to perform MAC reset for the second resource configuration mode, the terminal determines that the third SL process is unoccupied, so that these SL processes may be used to send other data. This avoids a decrease in a quantity of available SL processes, and improves a data receiving rate. The buffer of the third SL process is cleared, so that storage space can be released, and SL processes may also be used to send other data. This avoids the decrease in the quantity of available SL processes, and improves the data sending/receiving rate.

In addition, in a mode switching scenario, this application further provides Embodiment 8, to improve resource utilization.

Embodiment 8

Refer to FIG. 14. A method for releasing an SL resource according to Embodiment 8 includes the following steps.

1401: A terminal determines that a resource configuration mode is a first resource configuration mode.

1402: The terminal releases an SL resource corresponding to a second resource configuration mode and/or a configuration corresponding to the SL resource corresponding to the second resource configuration mode.

For the related description of Embodiment 8, refer to the related description in Embodiment 6. Details are not described herein again. In Embodiment 8, an SL resource associated with the second resource configuration mode and/or the configuration corresponding to the SL resource associated with the second resource configuration mode are released, so that resources may be subsequently used by another terminal. Therefore, resource utilization is improved.

Methods shown in Embodiment 6 to Embodiment 8 are also applicable to an LTE system. When the methods are used in the LTE system, the mode 1 needs to be replaced with the mode 3, and the mode 2 needs to be replaced with the mode 4 for understanding.

In the foregoing embodiments of this application, no matter on which parameter (for example, the destination address, the second resource configuration mode, the RRC connection of the SL) MAC reset is performed, whether MAC reset has been performed for the parameter is not limited. For example, it may be understood that the terminal performs/prepares to perform MAC reset on the parameter.

In the foregoing embodiments of this application, a buffer of an SL process of the transmit terminal may be referred to as a HARQ buffer, and a buffer of an SL process of the receive terminal may be referred to as a soft buffer. In this application, that an SL process is considered to be unoccupied may also be described as releasing the SL process or deactivating the SL process, and an unoccupied SL process may also be described as a deactivated SL process. Similarly, that an SL process is considered to be occupied may also be described as activating the SL process, and an occupied SL process may also be described as an activated SL process.

The methods provided in the foregoing embodiments may be combined when there is no conflict between the solutions. In addition to being executed by a terminal, the methods provided in the foregoing embodiments may be executed by another device.

The foregoing mainly describes the solutions of embodiments of this application from a perspective of a method. It may be understood that, to implement the foregoing functions, the terminal includes at least one of a corresponding hardware structure or a corresponding software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional units of the terminal may be divided based on the foregoing method example. For example, the terminal may be divided into functional units based on corresponding functions, or two or more functions may be integrated into one processing unit. The integrated unit may be implemented in a form of hardware, or may be implemented in a form of a software functional unit. It should be noted that, in embodiments of this application, division into the units is an example, and is merely a logical function division. In actual implementation, another division manner may be used.

Figure 15:
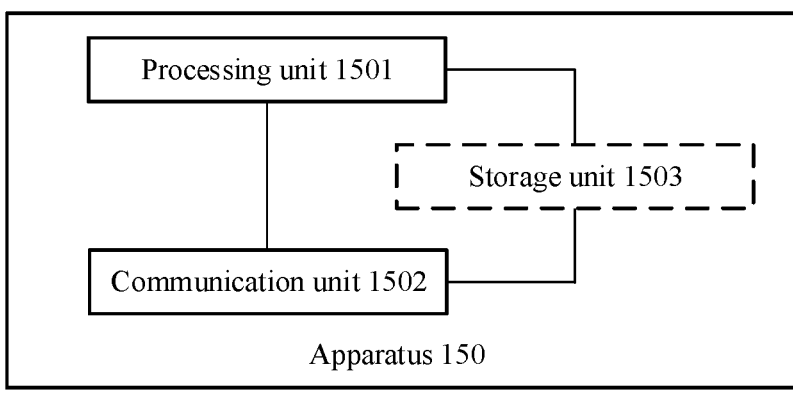
FIG. 15 is a schematic composition diagram of a terminal according to an embodiment of this application.

For example, FIG. 15 is a possible schematic diagram of a structure of an apparatus (denoted as an apparatus 150) used in the foregoing embodiments. The apparatus 150 includes a processing unit 1501 and a communication unit 1502. Optionally, the apparatus 150 further includes a storage unit 1503. The apparatus 150 may be configured to illustrate a structure of the terminal in the foregoing embodiments. In this case, the processing unit 1501 is configured to control and manage an action of the terminal. For example, the processing unit 1501 is configured to perform steps in FIG. 5, FIG. 7, FIG. 8, FIG. 9, FIG. 11, FIG. 12, FIG. 13, and FIG. 14, and/or actions performed by the terminal in another process described in embodiments of this application. The processing unit 1501 may communicate with another network entity by using the communication unit 1502, for example, transmit SL data or SCI with another terminal. The storage unit 1503 is configured to store program code and data that are of the terminal.

For example, the apparatus 150 may be a device, or may be a chip or a chip system.

When the apparatus 150 is a device, the processing unit 1501 may be a processor, and the communication unit 1502 may be a communication interface, a transceiver, or an input interface and/or an output interface. Optionally, the transceiver may be a transceiver circuit. Optionally, the input interface may be an input circuit, and the output interface may be an output circuit.

When the apparatus 150 is a chip or a chip system, the communication unit 1502 may be a communication interface, an input interface and/or an output interface, an interface circuit, an output circuit, an input circuit, a pin, a related circuit, or the like on the chip or the chip system. The processing unit 1501 may be a processor, a processing circuit, a logic circuit, or the like.

When an integrated unit in FIG. 15 is implemented in a form of a software functional module and sold or used as an independent product, the integrated unit may be stored in a computer-readable storage medium. Based on such an understanding, the technical solutions in embodiments of this application essentially, a part that contributes to the conventional technology, or all or a part of the technical solutions may be implemented in a form of a software product. The computer software product is stored in a storage medium and includes several instructions for enabling a computer device (which may be a personal computer, a server, a network device, or the like) or a processor (processor) to perform all or some steps of the methods in embodiments of this application. The storage medium that stores the computer software product includes any medium that can store program code, such as a USB flash drive, a removable hard disk, a read-only memory (read-only memory, ROM), a random access memory (random access memory, RAM), a magnetic disk, or an optical disc.

Figure 16:
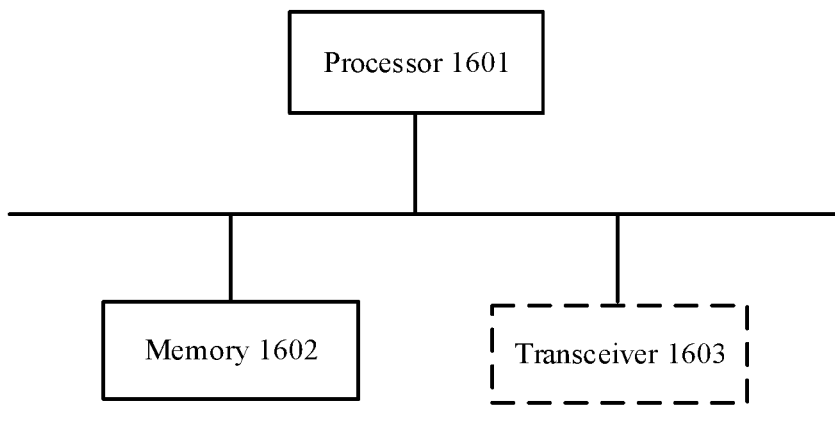
FIG. 16 is a schematic diagram of a hardware structure of a terminal according to an embodiment of this application.
Figure 17:
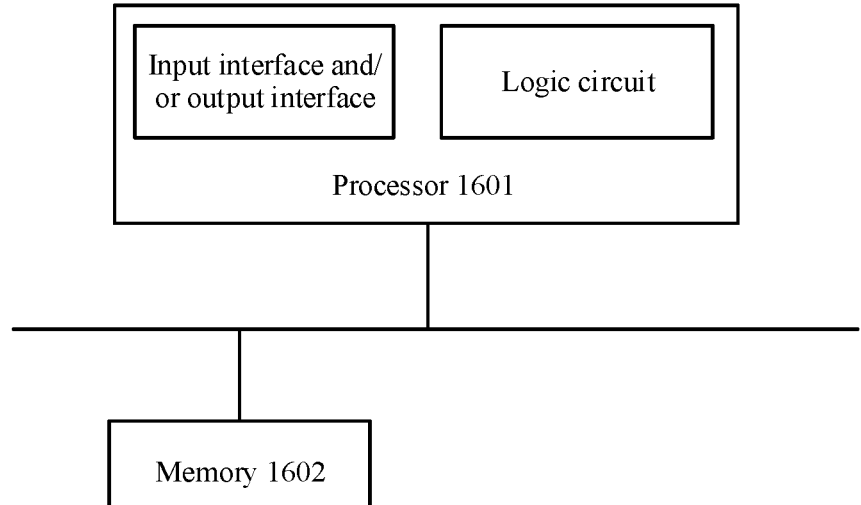
FIG. 17 is a schematic diagram of a hardware structure of still another terminal according to an embodiment of this application.

An embodiment of this application further provides a schematic diagram of a hardware structure of an apparatus. Refer to FIG. 16 or FIG. 17. The apparatus includes a processor 1601, and optionally, further includes a memory 1602 connected to the processor 1601.

The processor 1601 may be a general-purpose central processing unit (central processing unit, CPU), a microprocessor, an application-specific integrated circuit (application-specific integrated circuit, ASIC), or one or more integrated circuits configured to control program execution in the solutions of this application. Alternatively, the processor 1601 may include a plurality of CPUs, and the processor 1601 may be a single-core (single-CPU) processor, or may be a multi-core (multi-CPU) processor. The processor herein may be one or more devices, circuits, or processing cores configured to process data (for example, computer program instructions).

The memory 1602 may be a ROM or another type of static storage device that can store static information and instructions, a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM) or other optical disk storage, optical disk storage (including compact disc, laser disc, optical disc, digital versatile disc, Blu-ray disc, and the like), a magnetic disk storage medium or another magnetic storage device, or any other medium that can be configured to carry or store expected program code in a form of an instruction or a data structure and that can be accessed by a computer. This is not limited in this embodiment of this application. The memory 1602 may exist independently (in this case, the memory 1602 may be located outside the apparatus, or may be located inside the apparatus), or may also be integrated with the processor 1601. The memory 1602 may include computer program code. The processor 1601 is configured to execute the computer program code stored in the memory 1602, to implement the method provided in embodiments of this application.

Refer to FIG. 16. In a first possible implementation, the apparatus further includes a transceiver 1603. The processor 1601, the memory 1602, and the transceiver 1603 are connected through a bus. The transceiver 1603 is configured to communicate with another device or a communication network. Optionally, the transceiver 1603 may include a transmitter and a receiver. A component that is in the transceiver 1603 and that is configured to implement a receiving function may be considered to be a receiver, and the receiver is configured to perform receiving steps in embodiments of this application. A component that is in the transceiver 1603 and that is configured to implement a sending function may be considered to be a transmitter, and the transmitter is configured to perform sending steps in embodiments of this application.

Based on the first possible implementation, a schematic diagram of a structure shown in FIG. 16 may be used to illustrate a structure of the terminal in the foregoing embodiments. In this case, the processor 1601 is configured to control and manage an action of the terminal. For example, the processor 1601 is configured to perform steps in FIG. 5, FIG. 7, FIG. 8, FIG. 9, FIG. 11, FIG. 12, FIG. 13, and FIG. 14, and/or actions performed by the terminal in another process described in embodiments of this application. The processor 1601 may communicate with another network entity by using the transceiver 1603, for example, transmit SL data or SCI with another terminal. The memory 1602 is configured to store program code and data that are of the terminal.

In a second possible implementation, the processor 1601 includes a logic circuit and an input interface and/or an output interface. For example, the output interface is configured to perform a sending action in a corresponding method, and the input interface is configured to perform a receiving action in the corresponding method. Refer to FIG. 17. Based on the second possible implementation, a schematic diagram of a structure shown in FIG. 17 may be used to illustrate the terminal in the foregoing embodiments. In this case, the processor 1601 is configured to control and manage an action of the terminal. For example, the processor 1601 is configured to perform steps in FIG. 5, FIG. 7, FIG. 8, FIG. 9, FIG. 11, FIG. 12, FIG. 13, and FIG. 14, and/or actions performed by the terminal in another process described in embodiments of this application. The processor

1601 may communicate with another network entity by using an input interface and/or an output interface, for example, transmit SL data or SCI with another terminal. The memory 1602 is configured to store program code and data that are of the terminal.

In an implementation process, the steps in the method provided in embodiments may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

An embodiment of this application further provides a computer-readable storage medium, including computer-executable instructions. When the computer-executable instructions are run on a computer, the computer is enabled to perform any one of the foregoing methods.

An embodiment of this application further provides a computer program product, including computer-executable instructions. When the computer-executable instructions are run on a computer, the computer is enabled to perform any one of the foregoing methods.

An embodiment of this application further provides a communication system, including the foregoing terminal.

An embodiment of this application further provides an apparatus, including a processor and an interface. The processor is coupled to a memory by using the interface. When the processor executes a computer program or computer-executable instructions in the memory, any method provided in the foregoing embodiments is performed.

In descriptions of this application, "I" means "or" unless otherwise specified. For example, AB may represent A or B. In this specification, "and/or" describes only an association relationship between associated objects and represents that three relationships may exist. For example, A and/or B may represent the following three cases: Only A exists, both A and B exist, and only B exists. In descriptions of this application, unless otherwise stated, "at least one" means one or more, and "a plurality of" means two or more.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD)), or the like.

Although this application is described with reference to embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the protection scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method comprising:
   determining, by a terminal device, to perform media access control (MAC) reset on a radio resource control (RRC) connection of a sidelink;
   determining, by the terminal device, that a sidelink process associated with the RRC connection is unoccupied; and
   releasing, by the terminal device, an association relationship associated with the sidelink process, wherein the association relationship includes an association relationship between the sidelink process and sidelink control information (SCI).

2. The method according to claim 1, wherein the determining that the sidelink process is unoccupied is determined by a MAC entity of the terminal device, and wherein the method further comprises:

requesting, by an upper layer of a MAC layer of the terminal device, to perform MAC reset on the RRC connection.

3. The method according to claim 2, wherein the method further comprises:
   requesting, by an upper layer of an RRC layer of the terminal device, to release the RRC connection.

4. An apparatus, comprising:
   at least one processor; and
   one or more memories including computer instructions for execution by the at least one processor to cause the apparatus to perform operations comprising:
   determining, by a terminal device, to perform media access control (MAC) reset on a radio resource control (RRC) connection of a sidelink;
   determining that a sidelink process associated with the RRC connection is unoccupied; and
   releasing, by the terminal device, an association relationship associated with the sidelink process, wherein the association relationship includes an association relationship between the sidelink process and sidelink control information (SCI).

5. The apparatus according to claim 4, wherein the determining that the sidelink process is unoccupied is determined by a MAC entity of the terminal device, and wherein the operations further comprises:
   requesting, by an upper layer of a MAC layer of the apparatus, to perform MAC reset on the RRC connection.

6. The apparatus according to claim 5, wherein the operations further comprise:
   requesting, by an upper layer of an RRC layer of the apparatus, to release the RRC connection.

7. A non-transitory computer-readable storage medium comprising computer-executable instructions for execution by a computer to perform operations comprising:
   determining to perform media access control (MAC) reset on a radio resource control (RRC) connection of a sidelink;
   determining that a sidelink process associated with the RRC connection is unoccupied; and
   releasing an association relationship associated with the sidelink process, wherein the association relationship includes an association relationship between the sidelink process and sidelink control information (SCI).

8. The non-transitory computer-readable storage medium according to claim 7, wherein the determining that the sidelink process is unoccupied is determined by a MAC entity, and wherein the operations further comprises:
   requesting, by an upper layer of a MAC layer, to perform MAC reset on the RRC connection.

9. The non-transitory computer-readable storage medium according to claim 8, wherein the operations further comprises:
   requesting, by an upper layer of an RRC layer, to release the RRC connection.

* * * * *